(12) United States Patent
Higgins et al.

(10) Patent No.: US 7,824,604 B2
(45) Date of Patent: Nov. 2, 2010

(54) METHODS OF IMPLEMENTING A WATER-COOLING SYSTEM INTO A BURNER PANEL AND RELATED APPARATUSES

(75) Inventors: Christopher K. Higgins, Kennesaw, GA (US); Serban M. Cantacuzene, Houston, TX (US); James M. Cochran, Homer, GA (US); Yury Eyfa, Smyrna, GA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 312 days.

(21) Appl. No.: 11/712,377

(22) Filed: Feb. 28, 2007

(65) Prior Publication Data

US 2007/0267786 A1 Nov. 22, 2007

Related U.S. Application Data

(63) Continuation-in-part of application No. 11/488,449, filed on Jul. 17, 2006.

(60) Provisional application No. 60/834,854, filed on Aug. 1, 2006, provisional application No. 60/801,176, filed on May 17, 2006.

(51) Int. Cl.
*C21C 7/072* (2006.01)
*C21B 7/10* (2006.01)

(52) U.S. Cl. .............. 266/241; 266/216; 266/217; 266/218; 373/63; 373/75; 373/76; 373/79

(58) Field of Classification Search ............ 266/216, 266/217, 218, 241; 373/63, 75, 76, 79
See application file for complete search history.

(56) References Cited

U.S. PATENT DOCUMENTS

| 1,668,705 | A | * | 5/1928 | Wheelwright ............ 29/423 |
|---|---|---|---|---|
| 4,622,007 | A | | 11/1986 | Gitman |
| 4,637,034 | A | | 1/1987 | Grageda |
| 4,703,336 | A | | 10/1987 | Ovshinsky et al. |
| RE33,464 | E | | 11/1990 | Gitman |
| 4,979,896 | A | | 12/1990 | Kinoshita |
| 5,166,950 | A | | 11/1992 | Jouvaud et al. |
| 5,327,453 | A | | 7/1994 | Arthur et al. |
| 5,373,530 | A | | 12/1994 | Perrin |

(Continued)

FOREIGN PATENT DOCUMENTS

CN 1492209 4/2004

(Continued)

*Primary Examiner*—Roy King
*Assistant Examiner*—Lois Zheng
(74) *Attorney, Agent, or Firm*—Donna Blalock Holguin

(57) ABSTRACT

The present invention generally relates to apparatuses and methods for use in metal melting, refining and/or other processing, such as, for example, steel making in an electric arc furnace (EAF), and more particularly, to improved cooling systems and related methods for use in an extended burner panel.

18 Claims, 22 Drawing Sheets

U.S. PATENT DOCUMENTS

| | | |
|---|---|---|
| 5,426,664 A | 6/1995 | Grove |
| 5,444,733 A | 8/1995 | Coassin et al. |
| 5,471,495 A | 11/1995 | Berger et al. |
| 5,554,022 A | 9/1996 | Nabors et al. |
| 5,561,685 A | 10/1996 | Lehr et al. |
| 5,599,375 A | 2/1997 | Gitman |
| 5,740,196 A | 4/1998 | Johnson et al. |
| 5,772,430 A | 6/1998 | Pavlicevic et al. |
| 5,802,097 A | 9/1998 | Gensini et al. |
| 6,104,743 A | 8/2000 | Nomura et al. |
| 6,137,823 A | 10/2000 | Johnson et al. |
| 6,212,218 B1 | 4/2001 | Shver |
| 6,280,681 B1 * | 8/2001 | MacRae .................. 266/193 |
| 6,289,035 B1 | 9/2001 | Shver |
| 6,342,086 B1 | 1/2002 | Shver |
| 6,372,010 B1 | 4/2002 | Shver et al. |
| 6,440,747 B2 | 8/2002 | Althaus |
| 6,563,855 B1 | 5/2003 | Nishi et al. |
| 6,580,743 B1 | 6/2003 | Hirata et al. |
| 6,614,831 B2 | 9/2003 | Shver |
| 6,749,661 B2 | 6/2004 | Shver |
| 6,805,724 B2 | 10/2004 | Shver |
| 6,870,873 B2 | 3/2005 | Lyons et al. |
| 6,910,431 B2 | 6/2005 | Satchell |
| 6,999,495 B2 | 2/2006 | Popenov et al. |
| 2004/0174920 A1 | 9/2004 | Popenov |
| 2007/0267787 A1 | 11/2007 | Higgins et al. |

FOREIGN PATENT DOCUMENTS

| | | |
|---|---|---|
| EP | 1553192 | 7/2005 |

* cited by examiner

VIEW G

VIEW E

VIEW D

VIEW F

TOP VIEW  TOP VIEW

METHODS OF IMPLEMENTING A WATER-COOLING SYSTEM INTO A BURNER PANEL AND RELATED APPARATUSES

CROSS-REFERENCE TO RELATED APPLICATIONS

This application claims priority from US provisional application No. 60/801,176, filed on May 17, 2006, entitled "New Burner Panel". This application is a CIP of US non-provisional application Ser. No. 11/488,449, filed on Jul. 17, 2006, entitled "Improved Burner Panel and Related Methods", which claims priority from US provisional application No. 60/834,854, filed on Aug. 1, 2006, entitled "Methods of Implementing a Water-Cooling System into a Burner Panel and Related Apparatuses", the contents of the entirety of which are incorporated by reference.

BACKGROUND OF INVENTION

Various embodiments of the present invention generally relate to apparatuses and methods for melting, refining and processing metals. More particularly, embodiments of the present invention generally relate to burner panels for use in metal melting furnaces and/or the like.

The art of steel making is very well developed. In general, and most commonly, an electric arc furnace (EAF) is used to make steel by application of an electric arc to melt one or more scrap metals and/or other raw iron products and alloys that are placed within the furnace. Other methods include enhanced versions of EAFs that make steel by melting DRI (direct reduced iron) combined with the hot metal from a blast furnace. To enhance the steel making process, additional chemical energy is provided to the furnace by auxiliary means. The most common forms of auxiliary means comprise burners, injectors, and jets using fuel and an oxidizing gas to produce combustion products with a high heat content to assist the arc.

Further embodiments comprise multiple movable or permanently fixed burners utilizing hydrocarbon fuel such as, for example, natural gas or oil, at least one movable oxygen lance for injection of a stream of oxygen toward the molten bath for refining purposes and a movable means for injecting solid carbonaceous fuel for combustion and slag foaming purposes.

In various embodiments of EAFs, scrap metal, or charges, are dumped into the furnace through an opening. Quite typically these charges further comprise charged carbon and other slag forming materials. Other processes comprise using a ladle for hot or heated metal from a blast furnace and inserting it into the EAF furnace, such as by injection of the DRI by a lance.

There are numerous phases of charge processing in an EAF furnace and/or an EAF-like furnace. In the melting phase, the electric arc and burners melt the burden into a molten pool of metal (melted metal), called an iron carbon melt, which accumulates at the bottom or hearth of the furnace. Most commonly, after melting the charge, an electric arc furnace proceeds to a refining and/or decarburization phase.

In this phase, the metal melt continues to be heated by the arc until slag forming materials combine with impurities in the iron carbon melt and rise to the surface as slag. When the iron carbon melt reaches a boiling temperature, the charged carbon in the melt combines with any oxygen present in the bath to form carbon monoxide bubbles which rise to the surface of the bath, forming foaming slag. The foaming slag acts as an insulator throughout the furnace.

When an electric arc furnace operates without burners, the charged scrap or charge is rapidly melted at the hot spots at regions of highest electric current density, but often remains un-melted at the cold spots. This creates harsh conditions for furnace wall and refractory lining located at the hot spots due to excessive exposure to heat from the arc during the latter portions of the melt down cycle. Scrap located in the cold spots receives heat from the arc at a reduced rate during the melt down cycle, thereby creating cold spots. To melt the cold spots, the heat is applied for a longer period of total time, thereby applying heat to the hot spots for longer than desirable. This asymmetrical heat distribution from the arc and non-uniform wear of the furnace walls are typical for both alternating current and direct current arc furnaces operating without burners.

Cold spots are typically formed in areas further away from the furnace arc as scrap located in these areas receives electrical energy at a reduced rate per ton of scrap. A typical example of such a cold spot is the tapping spout, due to its location away from the arc. Another cold spot occurs at the slag door due to excessive heat losses to ambient air infiltrated through this area. It is common for furnaces utilizing additional injection of materials, such as slag forming material, direct reduced iron, etc., (which is removed through a slag door or through an opening in the furnace side wall) to create cold spots due to localized charging of additional heat consuming materials during the melt down cycle.

Prior art solutions to this challenge have been to incorporate further burners around the furnace to apply additional sources of heat to the cold spots. Electric arc furnaces equipped with burners located at cold spots have improved uniformity of scrap melting and reduce build-ups of materials at the cold spots. When auxiliary heat sources such as burners are placed in the electric arc furnace, their location is chosen to avoid further overheating of hot spots resulting from the rapid melting of scrap located between the electrode and the furnace shell. More specifically, the burners are located as far away from hot spots as is practically possible and the burner flame outlet opening direction is chosen so that flame penetration occurs predominantly into the scrap pile located at the cold spots and not to already heated portions of the furnace.

Further heating and processing is realized by a decarburization process wherein, in typical embodiments of the prior art utilizing advanced or more modern EAF techniques, a high velocity, usually supersonic, flow(s) of oxygen is blown into the metal bath with either lances or burner/lances to decarburize the bath by oxidation of the carbon contained in the bath, forming CO and/or $CO_2$. The burner(s)/lance(s) act more uniformly to melt the charge, lessen or prevent overheating, minimize the melt time and minimize the arc operating time.

By boiling the metal bath or liquid metal with the injected oxygen, the carbon content of the bath may be reduced to a selected or reduced level. It is commonly regarded that if an iron carbon melt is under 2% carbon, the melt becomes steel. EAF steel making processes typically begin with burdens having less than 1% carbon. The carbon in the steel bath is continually reduced until it reaches the content desired for producing a specific grade of steel, such as, for example, and not by way of limitation, down to less than 0.1% for low carbon steels.

In an effort to decrease steel production times in electric arc furnaces, apparatuses and methods have been developed to alter the means of delivering further energy to the furnace. Various such improvements include, but are not limited to, conventional burners mounted on the water-cooled side walls (panels or furnaces), conventional lances, conventional burners, and/or the like.

It has been long known that the use of cooling panels in an electric arc furnace increases the refractory sidewall life to at least twenty-five times that of normal refractory material. Further, the use of correctly installed cooling panels does not present a significant hazard to electric arc furnace operation. The water-cooled systems are capable of employing cooling panels both for the shell walls and also for the furnace roof.

Generally, the entire cooling system is formed of a ring of cooling panels encircling the furnace interior above the slag line.

Forced circulation of water or other cooling fluids through the cooling system is a characteristic to achieve efficient and reliable cooling.

Examples of prior art water-cooled elements of various burner panels may be found in at least U.S. Pat. Nos. 6,870,873; 6,580,743; 6,563,855; 6,137,823; 6,104,743; 5,772,430; 5,740,196; 5,561,685; 5,426,664; 5,327,453; 4,979,896; and 4,637,034.

The incorporation of water-cooled elements has allowed the use of further energy within the furnace to increase the efficiency of the furnace, decrease run time, and/or the like. Examples of further energy sources include the use of the burners together with carbon and/or oxygen lances and have allowed electric steelmakers to substantially reduce electrical energy consumption and to increase furnace production rate due to the additional heat input generated by the oxidation of carbon, and by significant increases in electric arc thermal efficiency achieved by the formation of a foamy slag layer that insulates the electric arc from heat losses. The foamy slag also stabilizes the electric arc and therefore allows for a higher electrical power input rate. The foamy slag layer is created by CO bubbles that are formed by the oxidation of injected carbon to CO. The increased flow of injected carbon creates increased localized CO generation. Accordingly, most EAF furnace units also comprise a postproduction means for removing or reducing CO levels in the off gas.

Mixing of the CO with oxygen inside of the electric arc furnace is desirable but very difficult to arrange without excessive oxidation of the slag and electrodes. Accordingly, the art field has developed post-production means for treating the high CO content of the off gas.

One of ordinary skill in the art may recognize that the most modern electric arc furnaces are equipped with all or some of the above-mentioned means for auxiliary heat input and or metal melting, in some part because of the incorporation of water-cooled elements.

Taken in connection with the improvements to the art field in the design and operation of metal melting furnaces have been improvements in burner panel design. Some such patents teaching and disclosing various burner panel configurations include, but are not limited to U.S. Pat. Nos. 4,703,336; 5,444,733; 6,212,218; 6,372,010; 5,166,950; 5,471,495; 6,289,035; 6,614,831; 5,373,530; 5,802,097; 6,999,495; and, 6,342,086. Such prior art patents have been beneficial. For example, U.S. Pat. No. 6,999,495 has found wide applicability for increasing spatial energy coverage in a furnace. Likewise, U.S. Pat. No. 6,614,831 has found applicability in extending the reach of various tools, such as a burner or a lance, into the interior of a furnace. However, the art field is in search of further improved apparatuses and methods for the melting of metals.

It is known that one of the causes of burner panel/lance failure is "flashback", "blowback" "rebound" and/or "jet reflection". These terms commonly refer to a condition resulting from jet (oxygen lance or burner jet) being reflected back to the panel whether the reflection is caused from the steel bath or melting metals (scrap materials inside the furnace that are not yet melted). The use of the term flashback shall mean and refer to all of the aforementioned terms unless specifically stated otherwise. Prior art solutions to various challenges associated with flashback have been dealt with by shielding the burner jet and/or lance. However, shielding often results in increasing the distance from the burner or lance to the steel bath or melting metals. Accordingly, the art field is in search of methods and apparatuses wherein a distance from a burner jet nozzle or lance nozzle to the molten metal is minimized while providing enhanced cooling to the burner panel.

SUMMARY

Various embodiments of the present invention generally relate to methods and apparatuses for implementing water-cooled systems into burner panels and related methods for use in a metal melting furnace. In general, novel and non-obvious aspects of embodiments of the present invention relate to enhanced characteristics of an improved method for implementing a water-cooled system into a burner panel and related water cooling systems that result in at least one of increased operational efficiency and/or increased service life.

Methods of implementing a water-cooled system of the present invention and related apparatuses find wide applicability in the burner panel art field. In preferred embodiments, methods and apparatuses of the present invention are particularly suited for a burner panel that is at least slightly elongated and extending generally away from a furnace wall and generally towards a metal line, thereby reducing the distance from the burner panel to the molten metal or metal line. Further, a substantial portion of various burner panels having enhanced applicability and/or suitability with methods and/or apparatuses of the present invention have surfaces extending from a furnace wall that is/are oriented other than orthogonal to at least the molten metal/metal line, wherein exposure of a substantial portion of the burner panel to at least one harsh condition of the furnace is reduced, thereby reducing the incidences of burner panel failure.

Methods and apparatuses of the present invention are also capable of use with burner panel apparatuses comprising at least one of burners, lances, supersonic lances, particulate injectors, post combustion apparatus, and/or the like.

Accordingly, improved features and/or enhanced characteristics of various methods and or apparatuses of the present invention comprise at least one of energy savings; improved burner efficiency; and a general reduction in burner panel failure.

A greater understanding of the present invention may be had from reference to the following detailed description and the appended claims.

BRIEF DESCRIPTION OF THE DRAWINGS

In order that the manner in which the above recited and other advantages and objects of the invention are obtained, a more particular description of the invention briefly described above may be rendered by reference to specific embodiments thereof, which are illustrated, in the appended drawings. Understanding that these drawings depict only typical embodiments of the invention and are therefore not to be considered limiting of its scope, the invention may be described with additional specificity and detail through the use of the accompanying drawings in which.

DESCRIPTION OF PREFERRED EMBODIMENTS

Figure 1:
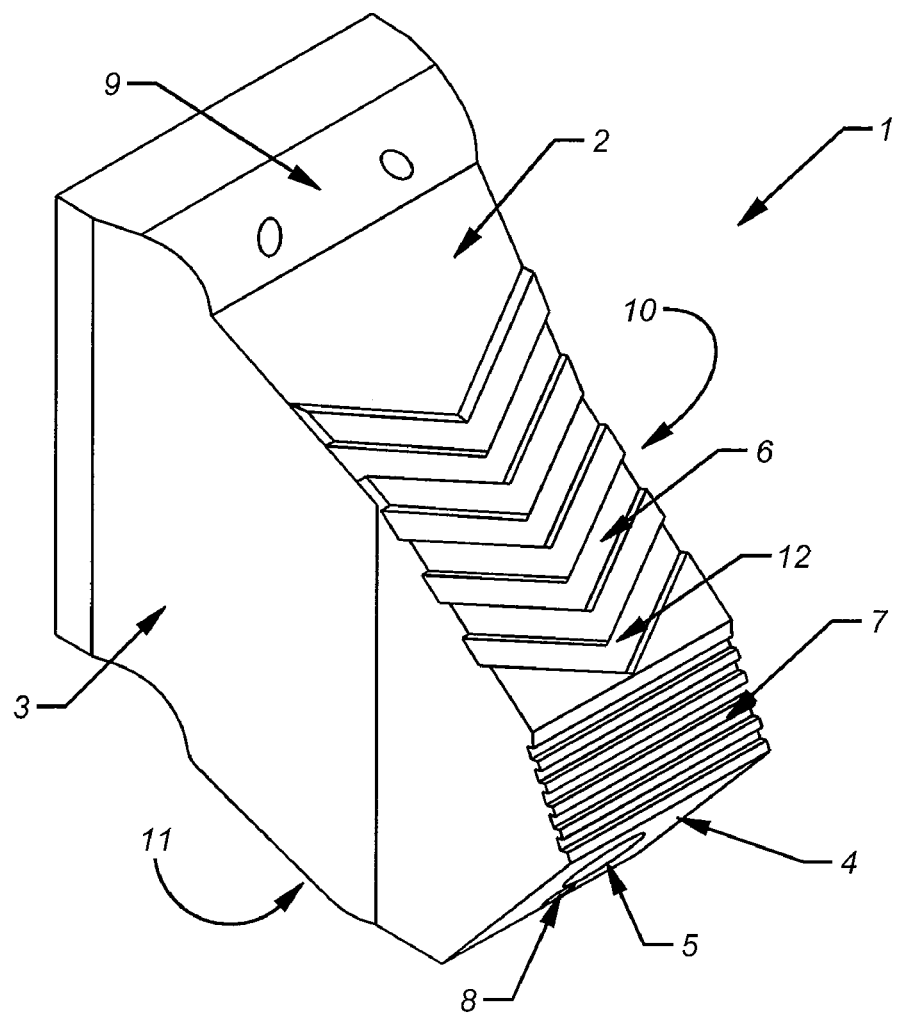
FIG. 1 is an illustration of a perspective view of an embodiment of a burner panel of the present invention.

The following definitions and explanations are meant and intended to be controlling in any future construction unless clearly and unambiguously modified in the following Examples or when application of the meaning renders any construction meaningless or essentially meaningless. In cases where the construction of the term may render it meaningless or essentially meaningless, the definition should be taken from Webster's Dictionary, $3^{rd}$ Edition.

As used herein the term, "air" means and refers to a gaseous mixture that comprises at least about 20 mole percent $O_2$.

As used herein, the term "attached," or any conjugation thereof describes and refers to the at least partial attachment of a tubesheet bundle and a vessel and/or core.

As used herein, the term "burden" means and refers to raw material loaded into a furnace.

As used herein, the term "burner" means and refers to all burners, lances, supersonic lances, and/or the like. In general, to burn something is for it to combust "a chemical reaction" facilitated and/or created by the addition of oxygen. Accordingly, a burner is any apparatus that adds oxygen.

As used herein, the term "burner panel", means and refers to, in terms of the various embodiments of this invention, any sidewall mounted panel, and not limited to any burner panel described herein. Further, many other enhanced characteristics of various embodiments of a fluid cooled system and/or related method may become apparent throughout this specification.

As used herein, the term "charge" means and refers to a batch of raw material loaded into a furnace.

For illustration purposes only, and not by way of limitation, two or more charges are referred to as a "heat". Typically, a "heat" is the end result/product of two or more charges. The "heat" is commonly tapped or loaded through the tap hole, most commonly located about EBT (Eccentric Bottom Tap). Tap-to-Tap times are desired benchmarks in the industry, as they relate to production rate. Likewise desired is "Power On" time for a particular combustion unit, the amount of time the electrodes are energized. Other considerations include percent yield that refers to iron loss during operation.

As used herein, the term "chemical reaction" means and refers to any interaction between two or more chemicals resulting in a chemical change in the original reactants. The reactions may be oxidative or reductive in nature. The reaction may occur in any state, including the solid, gaseous, or liquid state or an interface thereof. The reaction may be enhanced (e.g., efficiency improved, reaction rate increased) by addition of one or more catalysts.

Exemplary, non-limiting embodiments of furnaces capable of use with varying embodiments of the present invention include, but are not limited to U.S. Pat. Nos. 6,805,724; 6,749,661; 6,614,831; 6,440,747; 6,342,086; 6,289,035; 6,212,218; 5,802,097; 5,554,022; 6,910,431; 5,599,375; 4,622,007; and, Re. Pat. No. 33,464, the contents of which are hereby incorporated by reference as if they were presented herein in their entirety. In general, any furnace may be used with the various embodiments of the present invention.

Exemplary, non-limiting embodiments of fluid cooled systems capable of use with varying embodiments of the present invention include, but are not limited to U.S. Pat. Nos. 6,870,873; 6,580,743; 6,563,855; 6,137,823; 6,104,743; 5,772,430; 5,740,196; 5,561,685; 5,426,664; 5,327,453; 4,979,896; and 4,637,034, the contents of which are hereby incorporated by reference as if they were presented herein in their entirety. In general, any fluid-cooled system may be used with the various embodiments of the present invention.

As used herein, the term "field application" means and refers to experiments performed on samples, including samples taken from the environment, unless stated otherwise in the description.

As used herein, a "fluid" means and refers to a continuous, amorphous substance whose molecules move freely past one another and that has the tendency to assume the shape of its container, for example, but not limited to, a liquid or a gas.

As used herein, the term "foamy slag" means and refers to a practice where the slag entrains gas bubbles, usually, but not limited to, CO gas bubbles, and expands or is allowed or encouraged to expand in volume to at least partially cover the electrode(s) of the furnace and protect furnace components from the arc radiation that is very desirable in many steel making processes. Particulates, such as CaO and MgO, are often introduced to form slag and correct its chemistry to provide a good basis for slag foaming. Slag foaming is generally accomplished by the introduction of particulate carbon into the bath where it reduces FeO to Fe in an endothermic reaction producing CO bubbles which expand the volume of the slag and cause it to foam ("foamy slag"). The foamed slag, among other uses, acts as a blanket to at least partially hold in heat for the process and/or to shield furnace components from the radiation of the electric arc.

As used herein, the term "orthogonal" means and refers to an orientation of or relating to right angles.

As used herein, the term "slag" means and refers to the glass-like mass left as a residue by the smelting of metallic ore. The production of a correct slag composition for the iron carbon melt during the refining phase is desirable for achieving the appropriate steel chemistry and for cleaning the steel of impurities. In a furnace, slag exists both in a liquid state and a solid/semi-solid state.

As used herein, the term "tuyere" means and refers to a nozzle through which an air blast is delivered to a forge, blast furnace, blast oxygen furnace, and/or the like.

Other than in the operating examples, or where otherwise indicated, all numbers expressing quantities of ingredients or reaction conditions used herein are to be understood as modified in all instances by the term "about".

Various embodiments of the present invention have wide applicability across the art field for providing enhanced and/or improved water cooled systems for burner panels and related methods of use. This disclosure may discuss application of the improvements of the present invention as it relates to burner panels primarily in the field of steel making. However, one of ordinary skill in the art may be able to readily apply the technology across all fluid cooled technologies and the particular embodiments herein described should not be read as limiting on the full scope of this patent specification and the appended claims.

In general, novel and non-obvious aspects of embodiments of the present invention relate to at least one enhanced characteristic of an improved water-cooled system and related methods that result in at least one of increased operational efficiency and/or increased service life by maintaining or reducing a temperature of the burner panel. Maintaining or reducing the temperature of burner panel 20 and/or furnace wall 21 may allow for higher operating efficiency by increasing the operational temperature of the furnace, thereby melting the metal faster.

In various embodiments of the present invention, a fluid cooled system comprises a plurality of fluid cooling conduits running through and/or around a burner panel, most typically on the inside of the burner panel. In an embodiment, the cooling system is cast with the burner panel, such that the fluid cooled system is an integral part of the burner panel. In various embodiments, the fluid cooled system is situated such that it surrounds an apparatus aperture and/or an injector aperture to provide increased cooling capacity for areas of additional energy insertion into the furnace. In an embodiment of a burner panel capable of using a fluid cooled system of the present invention, the burner panel comprises a supersonic oxidizing gas lancing capability and an injector for particulate carbon in an electric arc furnace.

In an embodiment, a fluid cooled system of the present invention comprises an unbranched conduit. In an alternate embodiment, a fluid cooled system of the present invention comprises a branched conduit.

More particularly, in an embodiment of a fluid-cooled system of the present invention, the water cooled system comprises at least one fluid cooled conduit extending within and along at least one surface of a tapered burner panel apparatus mounted within a furnace, the burner panel apparatus comprising a tapered burner panel comprising shaped grooves; at least one apparatus aperture; and, at least one apparatus, wherein the water-cooled tapered burner panel extends outwardly from a furnace wall at least to a split line of the furnace and wherein the apparatus is at least one of an auxiliary thermal energy source, a particulate injector, or an oxygen injector.

Generally, an embodiment of a water-cooled system of the present invention may be inserted into burner panel 80. The incorporation of a water-cooled system overcomes many problems experienced in the art field by cooling burner panel 80. A common challenge experienced with prior art systems are that the flow of water through a water-cooling system has been inadequate to properly cool the burner panel. Accordingly, various embodiments of the present invention incorporate enhanced or increased diameter pipes over typical pipes incorporated in cast water-cooled panels of prior art. For example, the prior art typically uses a 1.0-inch diameter pipe for the water-cooling system. Further, other prior art embodiments use a Nom 1" schedule 80 pipe. However, various embodiments of a water-cooled system of the present invention incorporate a pipe 25% larger, a 1.25 inch pipe, thereby increasing the volume of water flow across or through burner panel 80 by at least 25%. At least one embodiment of the present invention incorporates a pipe with an inner diameter (effective diameter) that is 33.5% larger than typical prior art designs, a Nom 1¼" schedule 80 pipe, thereby increasing the volume of water flow across or through the burner panel 80 by at least 75%.

Although one embodiment of the present invention uses a Nom 1¼" schedule 80 pipe for the water-cooled system, another embodiment utilizes a square/rectangular pipe so that the surface area of the water-cooled system that is in contact with each of the burner panel surface is maximized for more efficient heat transfer/cooling.

Increasing the flow of water removes more heat and results in increased operational efficiency and/or increased service life.

In various embodiments, a conduit of a fluid-cooled system of the present invention winds through an interior space of a burner panel. In an embodiment, the conduit winds through at least five (5) 180-degree turns. In an alternate embodiment, the conduit winds through at least three (3) 180-degree turns. In an alternate embodiment, the conduit winds through at least seven (7) 180-degree turns.

In various embodiments, the conduit winds through at least two (2) 180-degree turns per surface. In an alternate embodiment, the conduit winds through at least three (3) 180-degree turns per surface. In an alternate embodiment, the conduit winds through at least four (4) 180-degree turns per surface. In an alternate embodiment, the conduit winds through at least five (5) 180-degree turns per surface.

In various embodiments, the conduit winds through at least two (2) 90-degree turns per at least one surface. In an alternate embodiment, the conduit winds through at least three (3) 90-degree turns per at least one surface. In an alternate embodiment, the conduit winds through at least four (4) 90-degree turns per at least one surface.

In various embodiments, the 90-degree and/or the 180-degree turns are conducted in or about the same plane as the conduit on the surface. In various other embodiments, the 90-degree and/or the 180-degree turns are performed in different planes than the plane occupied by the conduit on the surface.

As such, in an embodiment, the serpentine manner has at least one 180-degree turn and at least one 90-degree turn per at least one surface of the burner panel. In an alternate embodiment, the serpentine manner has at least two 180-degree turns and at least two 90-degree turns per at least one surface of the burner panel. In an alternate embodiment, the serpentine manner has at least three 180-degree turns and at least three 90-degree turns per at least one surface of the burner panel. In general, any number of 180-degree turns and 90-degree turns per at least one surface of the burner panel can be used.

In various embodiments, a conduit of a fluid cooled-system of the present invention is passed through a repeating and non-repeating serpentine loop in close proximity to at least one of the surfaces. In an embodiment, the serpentine loop is passed in close proximity to all of the surfaces.

In an embodiment of a water cooled system of the present invention a conduit is extended into a burner panel, along a plurality of surfaces, making several tortuous turns through a burner panel extending from a furnace wall, such that a majority of the surface area of the plurality of surface areas is capable of being cooled by a fluid flowing through the conduit. In an embodiment, a majority of the plurality of surfaces is within about 0.5 inches to about 12 inches from at least a portion of a water-cooled system of the present invention. In an alternate embodiment, all of the surfaces are within about 0.5 inches to about 12 inches from at least a portion of a water-cooled system of the present invention. In an alternate embodiment, all of the surfaces are within about 1.0 inch to about 8 inches from at least a portion of a water-cooled system of the present invention. In an alternate embodiment, all of the surfaces are within about 1.8 inches to about 6 inches from at least a portion of a water-cooled system of the present invention. In general, the distance from a surface to a fluid-cooled conduit is a matter of routine experimentation taking into account the operational temperature, fluid, material of furnace and/or conduit, desired effect, and/or the like.

Water cooled systems of the present invention allow at least one of decreased distance to the molten metal/metal line, energy savings, improved burner efficiency, ability to be used as a plug and use apparatus, and/or a reduction in burner panel failure.

Now referring to FIG. 1, an illustration of a three dimensional perspective view of an embodiment of a burner panel apparatus capable of use with various embodiments of the present invention. Burner Panel 1 generally comprises tapered upper surface 2, tapered sidewall surface 3, tapered sidewall surface 10, tapered underside surface 11, at least one shaped groove 6, front side surface 4, and aperture 5. Further embodiments comprise a straight groove portion 7, second aperture 8, post combustion aperture portion 9, an extending element (not shown), and/or the like, as is illustrated in FIG. 1. Shaped groove 6 is a V-shaped groove in this Figure.

Generally, in the embodiment of FIG. 1, tapered upper surface 2, tapered sidewall surface 3, tapered sidewall surface 10, and tapered underside surface 11 appropriately intersect at a first length from the furnace wall to form a quadrangular tapered structure. The taper extending from a furnace wall along at least a portion of the length of the burner panel towards the melting metal of the furnace (illustrated in FIG. 6). However, the tapered structure may generally be any structure capable of containing at least one apparatus, such as, but not limited to spherical, triangular, pentagonal, hexagonal, and/or the like structure. Further embodiments contemplate a structure that is not tapered and constructed with generally straight portions.

The structure of burner panel 1 has several advantages over wall mounted and/or wall-supported burner panels. A primary advantage is the decreased distance to the metal line from a burner panel of the present invention. In an embodiment, a burner panel of the present invention is capable of reaching at least to the split line (where the upper and lower furnace shells meet). In various embodiments, the burner panel of the present invention extends beyond, over, and/or lower than the split line. In an embodiment, the decrease in distance to the metal line is at least about 10%. In an alternate embodiment, the decrease in distance to the metal line is at least about 15%. In an alternate embodiment, the decrease in distance to the metal line is at least about 20%. In an alternate embodiment, the decrease in distance to the metal line is at least about 25%. In an alternate embodiment, the decrease in distance to the metal line is at least about 30%. In an alternate embodiment, the decrease in distance to the metal line is at least about 33%. In an alternate embodiment, the decrease in distance to the metal line is at least about 40%. In an alternate embodiment, the decrease in distance to the metal line is at least about 50%. The decrease in distance from the burner panel to the metal line may be modified by several factors, such as the length of the tapered burner panel, the use of a gap panel (as described in reference to FIG. 4), the height of the burner panel above the refractory portion, and/or the like.

Such advantage is at least partially due to the water-cooled system extending into an about the surfaces of the burner panel.

In various embodiments, a burner panel capable of use with various water-cooled systems of the present invention is capable of reaching beyond a sill line of the furnace, wherein the sill line is an edge of the refractory portion of the furnace, quite commonly the refractory bricks. In an embodiment, the decrease in distance to the metal line is at least about 10%. In an alternate embodiment, the decrease in distance to the metal line is at least about 15%. In an alternate embodiment, the decrease in distance to the metal line is at least about 20%. In an alternate embodiment, the decrease in distance to the metal line is at least about 25%. In an alternate embodiment, the decrease in distance to the metal line is at least about 30%. In an alternate embodiment, the decrease in distance to the metal line is at least about 33%. In an alternate embodiment, the decrease in distance to the metal line is at least about 40%. In an alternate embodiment, the decrease in distance to the metal line is at least about 50%. The decrease in distance from the burner panel to the metal line may be modified by several factors, such as the length of the tapered burner panel, the use of a gap panel (as described in reference to FIG. 4), the height of the burner panel above the refractory portion, and/or the like.

In the embodiment illustrated in FIG. 1, at least one shaped groove 6 is oriented along upper surface 2. In the embodiment illustrated, shaped groove 6 is a V-shaped groove 6. The apex 12 of at least one V-shaped groove 6 generally points along or follows the taper of upper surface 2. V-shaped groove 6 acts to channel foaming slag and/or slag along upper surface 2 of burner panel 1. The V-shaped grooves unexpectedly channel a flow of a slag wherein the slag is capable of forming an at least partially solidified layer about the burner panel. The at least partially solidified layer of slag on the panel is capable of at least partially insulating the burner panel, thereby at least one of protecting the burner panel from damage and/or increasing the service life of the burner panel.

The increased effect of the V-shaped grooves is at least partially due to the water-cooled system of the present invention.

Shaped groove 6 is illustrative of a general structure of a groove to be used on various embodiments of the present invention. In an embodiment, shaped groove 6 is U-shaped. In an alternate embodiment, shaped groove 6 is arcuate. In general, V-shaped groove 6 may be any arcuate structure.

Slag inside the furnace exists in at least two states, liquid and solid. As the foaming slag and/or slag boils, pops, expands, and/or the like, at least a portion of it may contact a surface of burner panel 1. As a liquid, the slag may still offer protection. However, in the solid state, the slag offers far more protection, in general.

When the slag is in a solid state, the V-shaped grooves act as a footing for the slag, offering resistance to assist in preventing the slag from sliding or moving off burner panel 1. When the slag is in the liquid state, the V-shaped grooves may act to keep the slag on burner panel 1 longer by directing the slag along the length of upper surface 2 of panel burner panel 1. Keeping the slag on burner panel 1 longer may allow a cooling system (not shown in FIG. 1) to act through burner panel 1 on the slag, wherein the cooling system may cool the slag. Cooling the slag may enhance the formation of solid-state slag or semi-solid state slag wherein the operational efficiency and/or service life of burner panel 1 may be enhanced.

In various embodiments, incorporation of V-shaped grooves increases operational efficiency by at least about 5%. In an alternate embodiment, incorporation of V-shaped grooves increases operational efficiency by at least about 10%. In an alternate embodiment, incorporation of V-shaped grooves increases operational efficiency by at least about 15%. In an alternate embodiment, incorporation of V-shaped grooves increases operational efficiency by at least about 20%. In an alternate embodiment, incorporation of V-shaped grooves increases operational efficiency by at least about 30%. In an alternate embodiment, incorporation of V-shaped grooves increases operational efficiency by at least about 40%.

In various embodiments, incorporation of V-shaped grooves increases service life by at least about 5%. In an alternate embodiment, incorporation of V-shaped grooves increases service life by at least about 10%. In an alternate embodiment, incorporation of V-shaped grooves increases service life by at least about 15%. In an alternate embodiment, incorporation of V-shaped grooves increases service life by at least about 20%. In an alternate embodiment, incorporation of V-shaped grooves increases service life by at least about 30%. In an alternate embodiment, incorporation of V-shaped grooves increases service life by at least about 40%.

The V-shaped grooves have an unexpected result of further aiding in the shielding process or effect of a foaming slag or a slag coating.

In an embodiment, front side surface 4 is the only portion of the extending portion of burner panel 1 that is orthogonal to potential splashing metal from melting metal in the furnace, thereby reducing the incidences of direct hits. Further reduction in hits is accomplished by minimizing the size of front side surface 4.

In an embodiment, front side surface 4 is slightly larger than at least one aperture 5. In an alternate embodiment, a second aperture 8 is on front side surface 4. In yet a further embodiment, further apertures are added. In general, any number of apertures may be included on front side surface 4. Generally, an aperture exists for each apparatus extending through and/or associated with burner panel 1. Aperture 5, second aperture 8, and/or any other aperture may be any desired size. Typically, the size of an aperture is related to the size of the associated apparatus. In applications wherein concern exists for a burner panel failure, the size of an aperture and the size of a front panel is minimized, to reduce the orthogonal area.

The shape of an aperture may vary. In general, apertures are circular. However, apertures may be of any shape, such as, but not limited to spherical, triangular, pentangular, hexangular, and/or the like structure. Generally, an aperture shape is associated with the shape of the associated apparatus.

Various embodiments of a burner panel of the present invention further comprise a straight groove portion 7. Straight groove portion 7 is adapted to further assist in the accumulation of foaming slag and/or slag. Straight groove portion 7 is an optional element.

In various embodiments, a post combustion portion 9 is associated or affixed to burner panel 1. Post combustion portion 9 is used to add further oxygen or other gas to the furnace.

In an embodiment, burner panel 1 is constructed to fit within a pre-existing slot for a burner panel. Likewise, a cooling system of the present invention may be formed or cast to fit within a pre-existing slot. In other embodiments, burner panel 1 is adapted to utilize furnace panel attachment means, such as bolts, clamps, screws, nails, glue, and/or the like. It is anticipated that bracket portion 9 may have some areas orthogonal to potential splashing metal from the melting metal. However, such orthogonal areas should be minimized, as they increase risk of burner panel failure.

A fluid-cooled system of the present invention generally is capable of being placed/secured/formed along an inside surface of any of tapered upper surface 2, tapered sidewall surface 3, tapered sidewall surface 10, tapered underside surface 11, at least one shaped groove 6, front side surface 4, and aperture 5. In general, an associated fluid-cooled system comprises at least one conduit. The conduit is capable of being of any structure, such as, but not limited to a pipe and/or the like. Likewise, the conduit is capable of being constructed of any material, such as, but not limited to steel, copper, iron, a composite, and alloy, and/or the like. Generally any structure capable of transferring heat is acceptable.

In various embodiments, an identifying characteristic of embodiments of the present invention is the thermal conductivity of the material used to construct the conduit. In an embodiment, higher coefficients of thermal conductivity are desired. In an alternate embodiment, lower coefficients of thermal conductivity are desired.

In an embodiment, a coefficient of thermal conductivity is between about 0.1 and about 1.0. In an alternate embodiment, a coefficient of thermal conductivity is between about 0.2 and about 0.8. In an alternate embodiment, a coefficient of thermal conductivity is between about 0.4 and about 0.6. In an alternate embodiment, a coefficient of thermal conductivity is between about 0.45 and about 0.55. In general, any coefficient of thermal conductivity may be chosen for a suitable application.

Further identifying characteristics of a fluid cooled system of the present invention comprise a radius of bending. The radius of bending is calculated from the ratio of the diameter of the conduit and the minimum diameter of a 180-degree bend of the conduit without the conduit experiencing any change in negative change in the diameter of the conduit. In an embodiment, the ratio is between about 0.2 and about 0.9. In an alternate embodiment, the ratio is between about 0.4 and about 0.7. In an alternate embodiment, the ratio is between about 0.5 and about 0.6.

In various embodiments, the minimum radius is between about 0.5 inches to about 4.0 inches. In an alternate embodiment, the minimum radius is between about 1.0 inch and about 3.0 inches. In an alternate embodiment, the minimum radius is between about 1.5 inch and about 2.5 inches. In an alternate embodiment, the minimum radius is between about 2.0 inch and about 2.2 inches.

Figure 2:
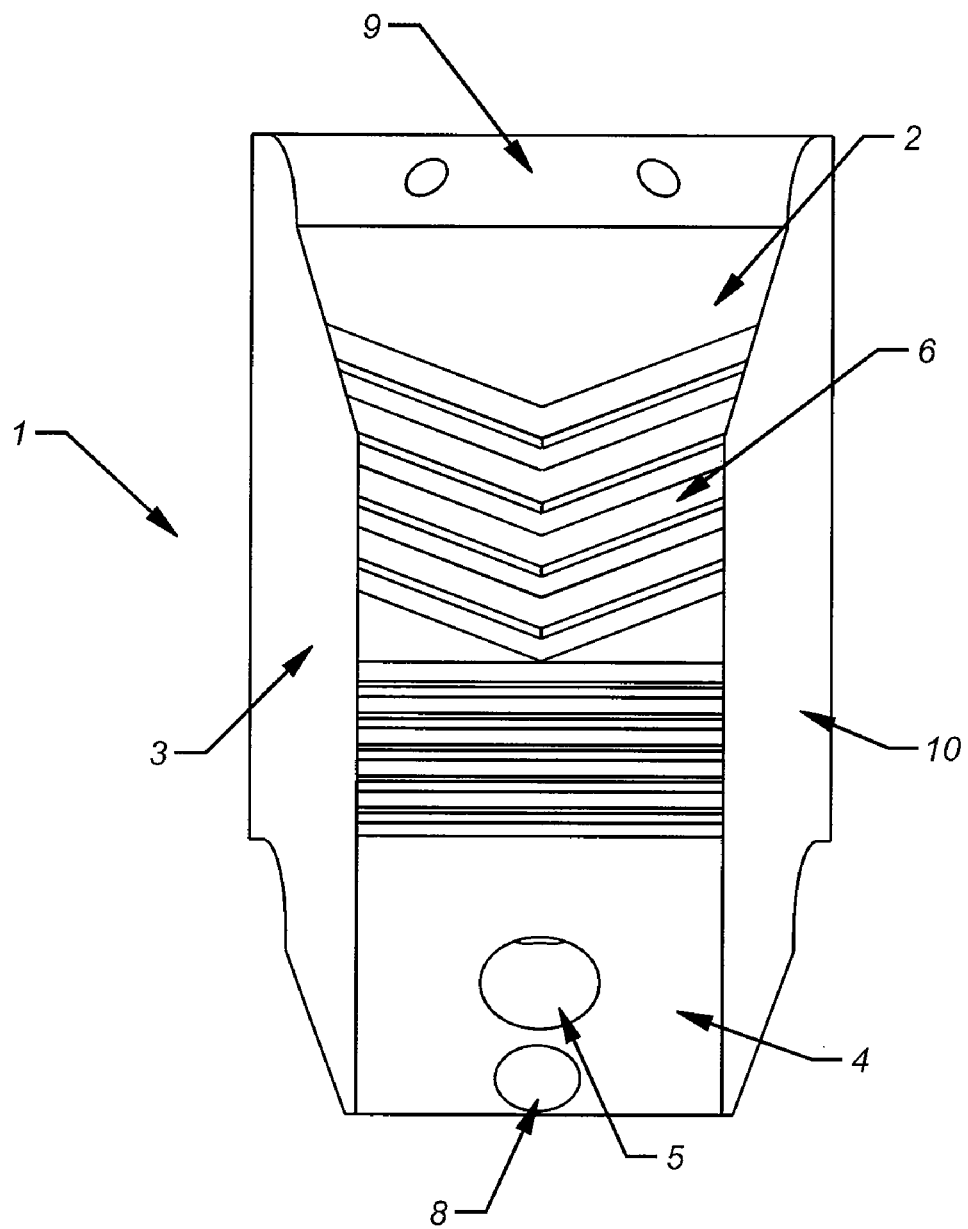
FIG. 2 is an illustration of a front perspective view of the embodiment of FIG. 1.
Figure 15:
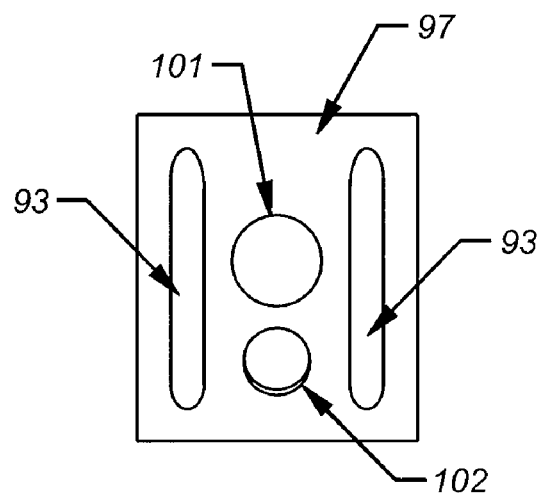
FIG. 15 is an illustration of section B-B on FIG. 9.

Now referring to FIG. 2, a front perspective view of the apparatus of FIG. 1 is presented. The general taper of an embodiment is illustrated. As is made more apparent, front side surface 4 is substantially the only surface orthogonal to potential splashing metal from the melting metal and/or flashback. Accordingly, a cooling system of the present invention may provide conduit along at least front side surface 4. Reference to FIG. 15 illustrates an embodiment of a portion of a cooling system along a front side surface of a burner panel.

In various other embodiments, at least a portion of a cooling system extends about, to, along, underneath, is congruent with, and/or through front side surface 4 to provide cooling to the surface of the burner panel closest to the metal melt line and/or provide protection from splashing metal, flashback, and/or the like.

In various embodiments, each surface extending away from the wall of the furnace is at least partially cooled by at least a portion of the cooling system. In general, any fluid may be used. Suitable examples of fluids include, but are not limited to water, freon, nitrogen, and/or the like.

Figure 3:
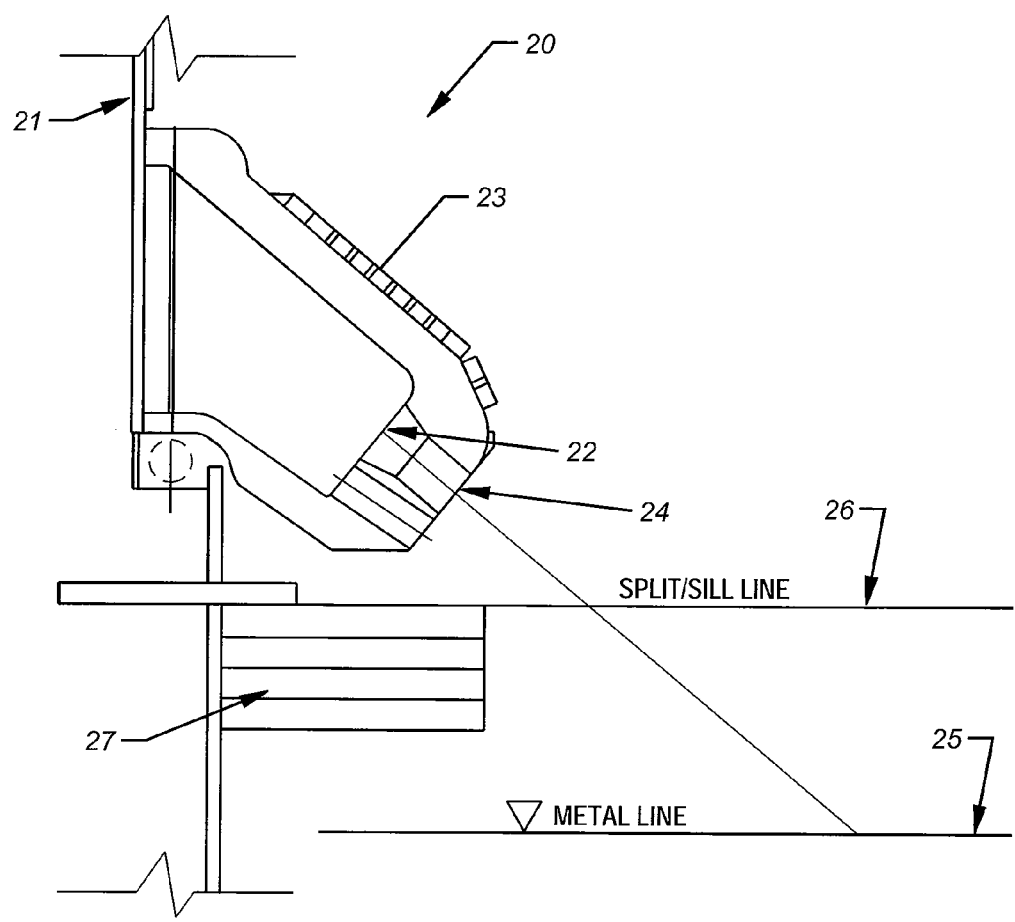
FIG. 3 is an alternate embodiment of a cross-section of a burner panel of the present invention wherein the burner panel is attached to a furnace wall.

Now referring to FIG. 3, a side perspective view of an embodiment of a burner panel 20, aperture 24, and at least one V-shaped groove 23 of the present invention attached to a furnace wall 21 is illustrated. Burner panel 20 is attached to furnace wall 21. Burner panel 20 is typically placed and/or oriented along a lower portion (within, in an embodiment, a lower panel space) of furnace wall 21 above refractory portion or brick 27. Aperture 24 of burner panel 20 extends over and beyond refractory portion 27, thus minimizing a distance from aperture 24 to metal line 25, the melting metal.

Burner panel 20 illustrates a cavity 22 for an apparatus. Cavity 22 generally extends throughout the body of burner panel 20 to about aperture 24 and across furnace wall 21.

An embodiment of a water-cooling system positioned within burner panel 20 to assist in removing heat from the surface of burner panel 20 is an independent system. In an alternate embodiment, the cooling system is a portion of the furnace wall cooling system. Typically, a furnace wall cooling system comprises large water pipes, about 2 inches in diameter, whereas a burner panel may be constructed such that the cooling pipes are smaller in diameter. A smaller burner panel is typically desired as it is lighter and comprises less material, thereby making it more economical to construct. Accordingly, if a desired conduit size for use in a burner panel is smaller than the conduit of the water-cooling system associated with the furnace wall, a regulator or other means may be used to reduce the size of the pipe and/or flow of the fluid. Excess fluid may be expelled from the connection of the burner panel and the furnace wall. The excess water is capable of being recaptured and used for further procedures, such as cooling procedures.

In the embodiment of a burner panel illustrated in FIG. 3, burner panel 20 does not extend below split line. However, in various other embodiments, burner panel 26 does extend below split line 26, thereby decreasing the distance between an aperture of a burner panel of the present invention and a metal line. Embodiments of cooling systems of the present invention assist further extending a burner panel toward the metal line.

Figure 4:
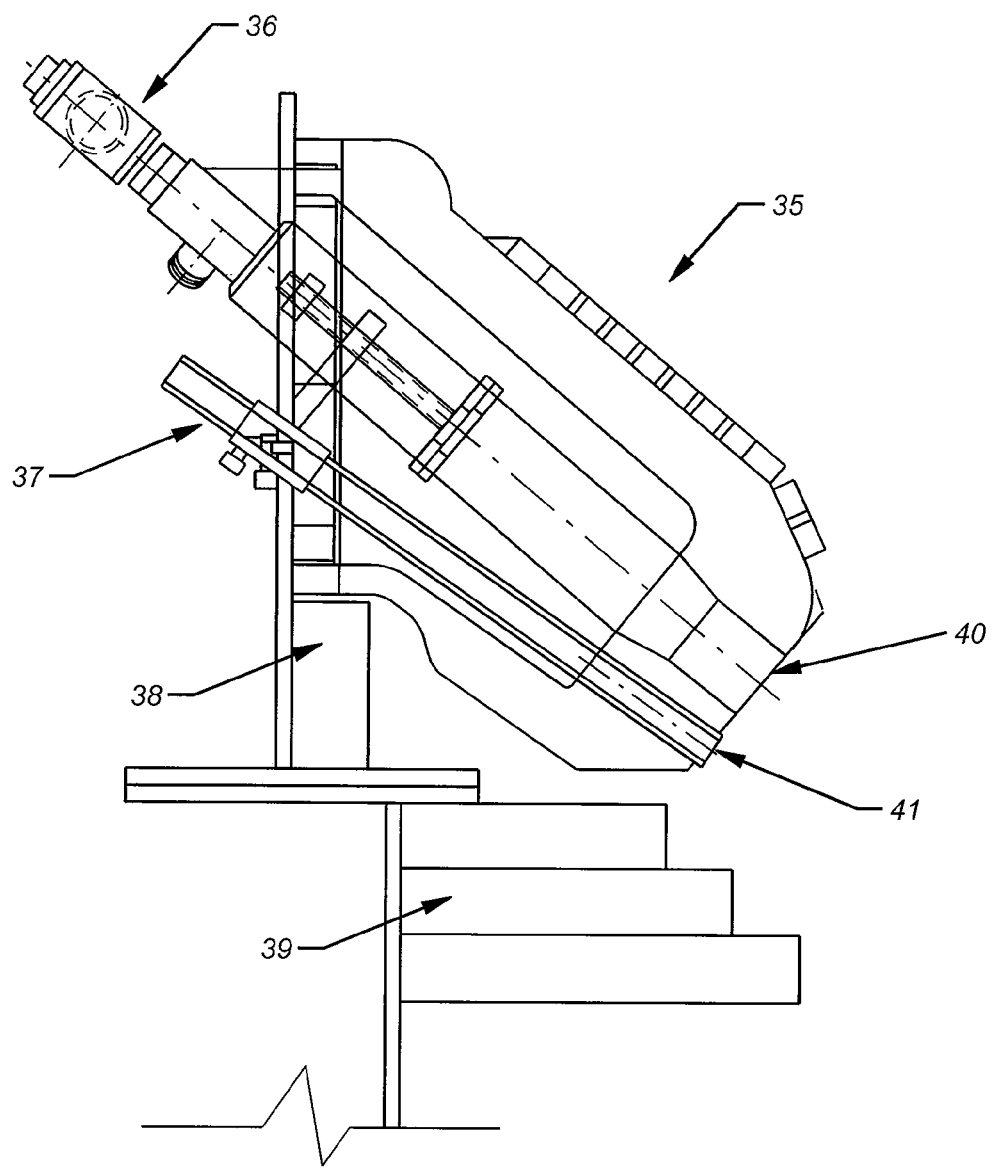
FIG. 4 is an illustration of an alternate embodiment of a cross-section of a burner panel with a gap panel inserted below the burner panel illustrating an angle of incidence for a burner injector and a carbon injector.

Now referring to FIG. 4, a burner panel 35 is illustrated with an oxygen injector apparatus 36, a carbon injector apparatus 37, refractory portion 39, aperture 40, and aperture 41. Aperture 40 and aperture 41 are aligned such that the discharge from oxygen burner apparatus 36 and a carbon injector apparatus 37 intersect at about the metal line. Maximum effect from the carbon injection and the oxygen burner is experienced when the two streams are introduced to the metal line at or about the point of mixture. However, various other embodiments mix the two streams before introduction to the melting metal. In general, a flow rate of an apparatus causes both a region of negative pressure and eddy currents in the proximity. The flows in the vicinity are based in part on Bernoulli's' equation. In an embodiment, the object is to get the carbon injection close enough to be "sucked" into the stream path and not to be deflected and more inefficiently dispersed by the circulating eddy currents, as may be expected to happen if the apertures were separated at to great a distance.

The number of apparatuses associated with a burner panel apparatuses may vary from 1 to 10. In an embodiment, there is a dedicated aperture for each apparatus. In an alternate embodiment, one or more apparatuses share an aperture.

In an embodiment of an associated apparatus of the present invention, the apparatuses are positioned side by side in a burner panel at about a nozzle at the entrance of a flame-shaping chamber of a fluid cooled combustion chamber. Various embodiments further comprise a plurality of fuel orifices for providing pressurized fuel to the combustion chamber and/or a plurality of oxidizing gas orifices for providing a secondary flow of an oxidizing gas around the periphery of the nozzle. In an embodiment, all of the flows of fuel, oxidizing gas and particulates pass through the flame-shaping chamber, and are all substantially directed to the same location in the electric arc furnace. The directionality of the various flows allows the apparatuses to heat a localized spot of the slag/charge with thermal energy from the oxidation of the fuel, from the oxidation of oxidizable components in the slag or the melt by the lancing of supersonic oxidizing gas, and/or from any combination of these.

In an embodiment, once a spot in the slag is sufficiently heated, a flow of carbon is directed to the localized hot spot in the slag to reduce the FeO, and other oxides, in the slag to carbon monoxide and produce foamy slag. The particulate carbon introduction may be accompanied by further oxidizing gas injection before, during, and/or after the carbon injection.

Furnaces constructed typically have a somewhat uniform structure. A benefit of the various designs of embodiments of the present invention are that they may be adapted to fit within pre-machined and/or cut areas, such as a panel gap or to replace a panel. In an embodiment, burner panel 35 is designed smaller than the available space within the furnace wall and a gap panel 38 is used to make up the difference. An advantage to using a gap panel 38 is that the installation of burner panel 35 may be adjusted. For example, and not by way of limitation, to alter or change the angle of incidence from an apparatus to the metal line, gap panel 38 may be removed and reinstalled above burner panel 35, thereby lowering burner panel 35 and decreasing the distance from aperture 40 and/or aperture 41 to a metal line.

Gap panel 38 may also be used to raise burner panel 35. Raising burner panel 35 may be desirable in situations where burner panel 35 is wearing rapidly or if the melting rate within the furnace is to be lowered.

Figure 5:
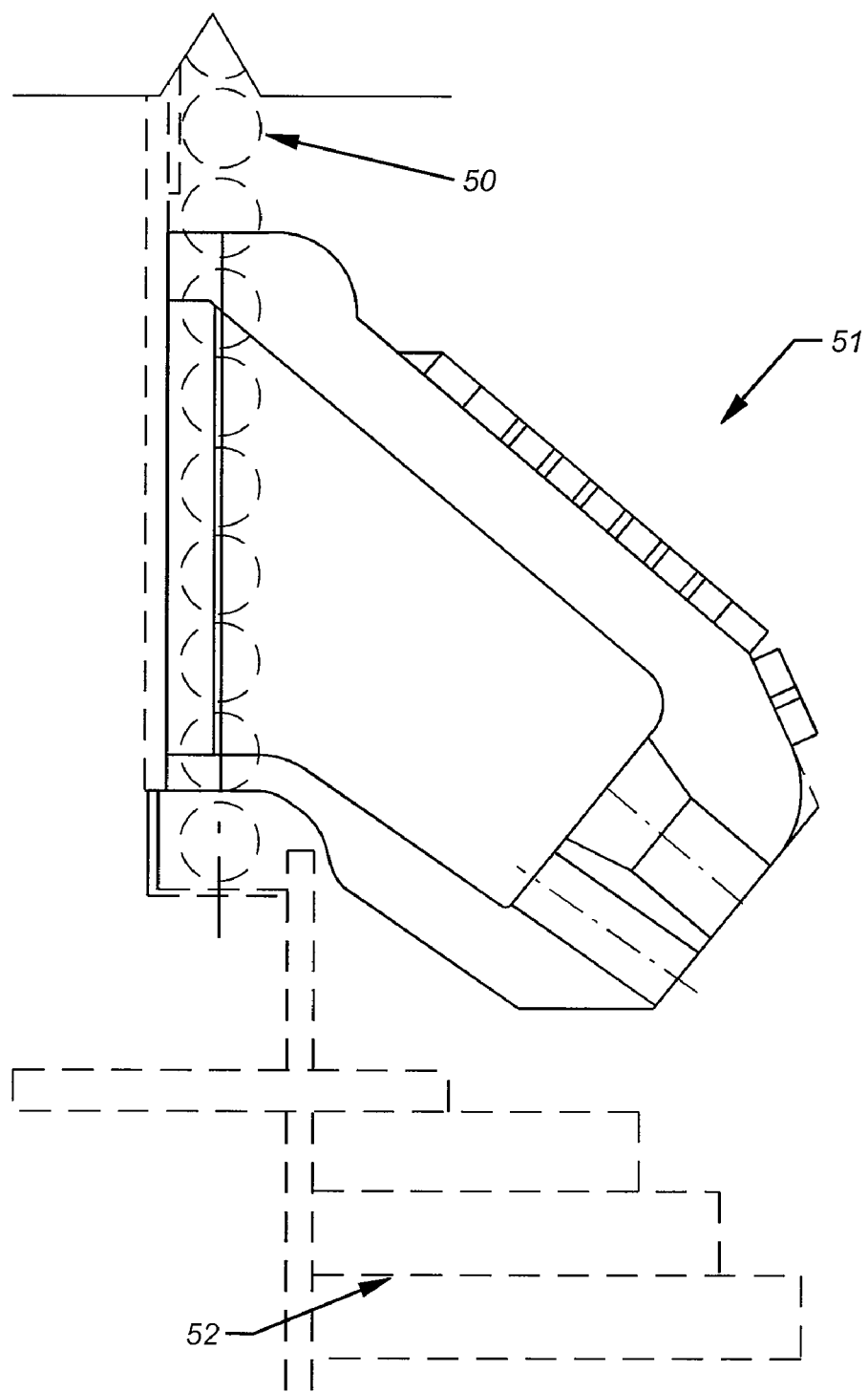
FIG. 5 is an illustration of a cross-section of an alternate embodiment of a burner panel installed on a furnace wall.

Now referring to FIG. 5, a side perspective of a burner panel 51 with water-cooled furnace elements 50, the furnace wall above refractory portion 52 is water-cooled. Water-cooling is accomplished typically by piping or conveying water along or near a surface of the furnace. The conveyed water removes heat from the furnace, thereby cooling the furnace. Water is kept flowing through water-cooled elements 50. In an embodiment, the greater the flow of water, the greater the amount of heat removed from the furnace. Typically, all furnace walls have a cooling system, such as water-cooling. Cooling is not generally desirable along the refractory portion, as the refractory portion is typically capable of handling and/or withstanding the heat. However, various embodiments comprise a cooling system that at least partially cools a portion of the refractory portion, thereby reducing stress on the refractory portion and/or increasing service life.

In various embodiments, burner panel 51 is a plug and use system, such that at least a portion of a furnace panel is removed and an embodiment of a burner panel of the present invention is inserted in the space occupied previously by at least a portion of the furnace panel. In an embodiment, a cooling system associated with the burner panel is regulated prior to use. In an alternate embodiment, a stand-alone cooling system is used with a plug and use burner panel of the present invention.

Figure 6:
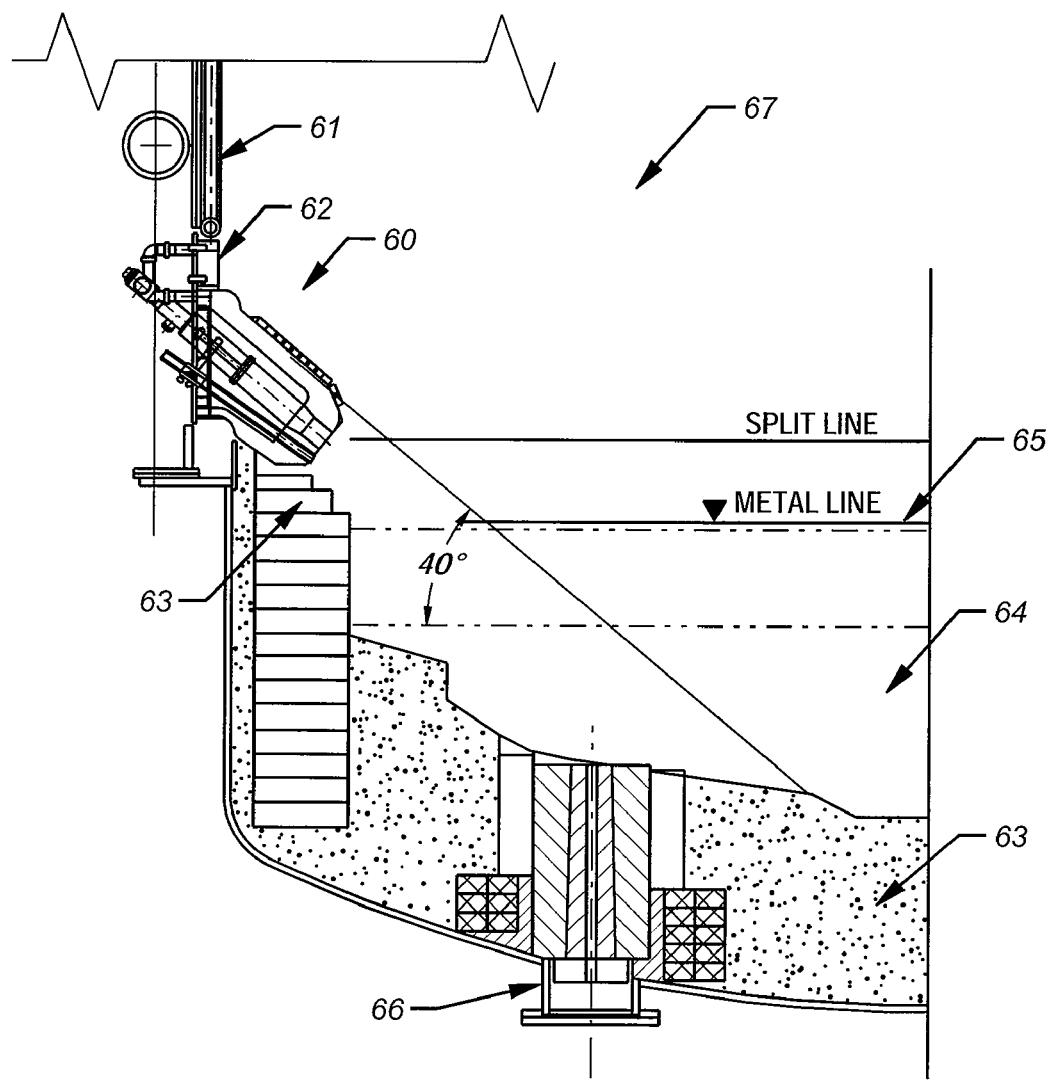
FIG. 6 is an illustration of a cross-section of a furnace illustrating a cross section of an embodiment of a burner panel of the present invention

Now referring to FIG. 6, an embodiment of a burner panel 60 is illustrated in a furnace 67. Burner panel 60 is installed in furnace wall 61, below gap panel 62, and above refractory portion 63. Refractory portion 63 generally includes at least a refractory brick portion. Furnace 67 comprises furnace wall 61, melting metal 64, a melting metal line 65, refractory portion 63 and door 66. Generally, at least one burner panel 60 applies energy to melting metal 64. In various embodiments, multiple burner panels 60 are installed. In fact, a burner panel 60 may be installed proportionately about furnace 67 such that no cold spots remain or that such cold spots are minimized. As may be seen, areas orthogonal of burner panel 60 to metal melt line 65 are reduced. Door 66 may be a variety of structures, including, but not limited to a bottom tap, an Argon stir port, and/or the like.

Figure 7:
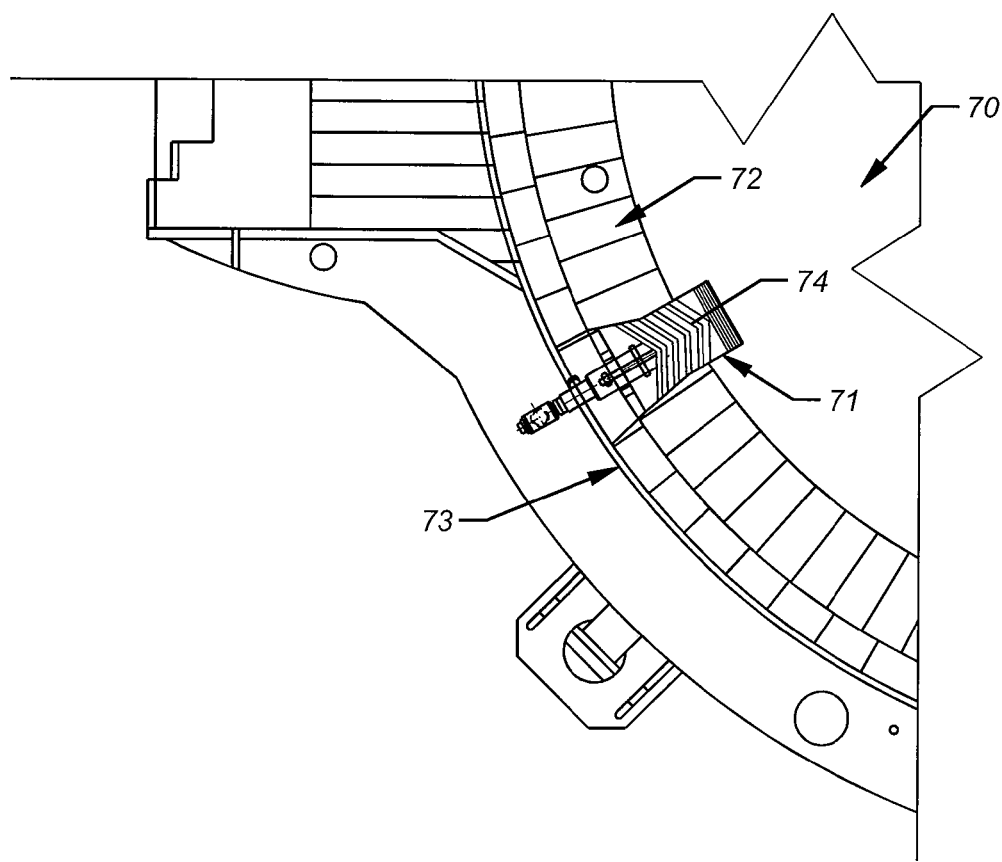
FIG. 7 is an illustration of a top view of an alternate embodiment of a burner panel installed on a furnace wall.

Now referring to FIG. 7, a top perspective of furnace 70 is illustrated. A burner panel 71 extends across furnace wall 73 towards a melting metal (not illustrated) above refractory portion 72. V-shaped portion 74 is oriented towards the interior of furnace 70. In various embodiments, multiple burner panels are installed.

Figure 8:
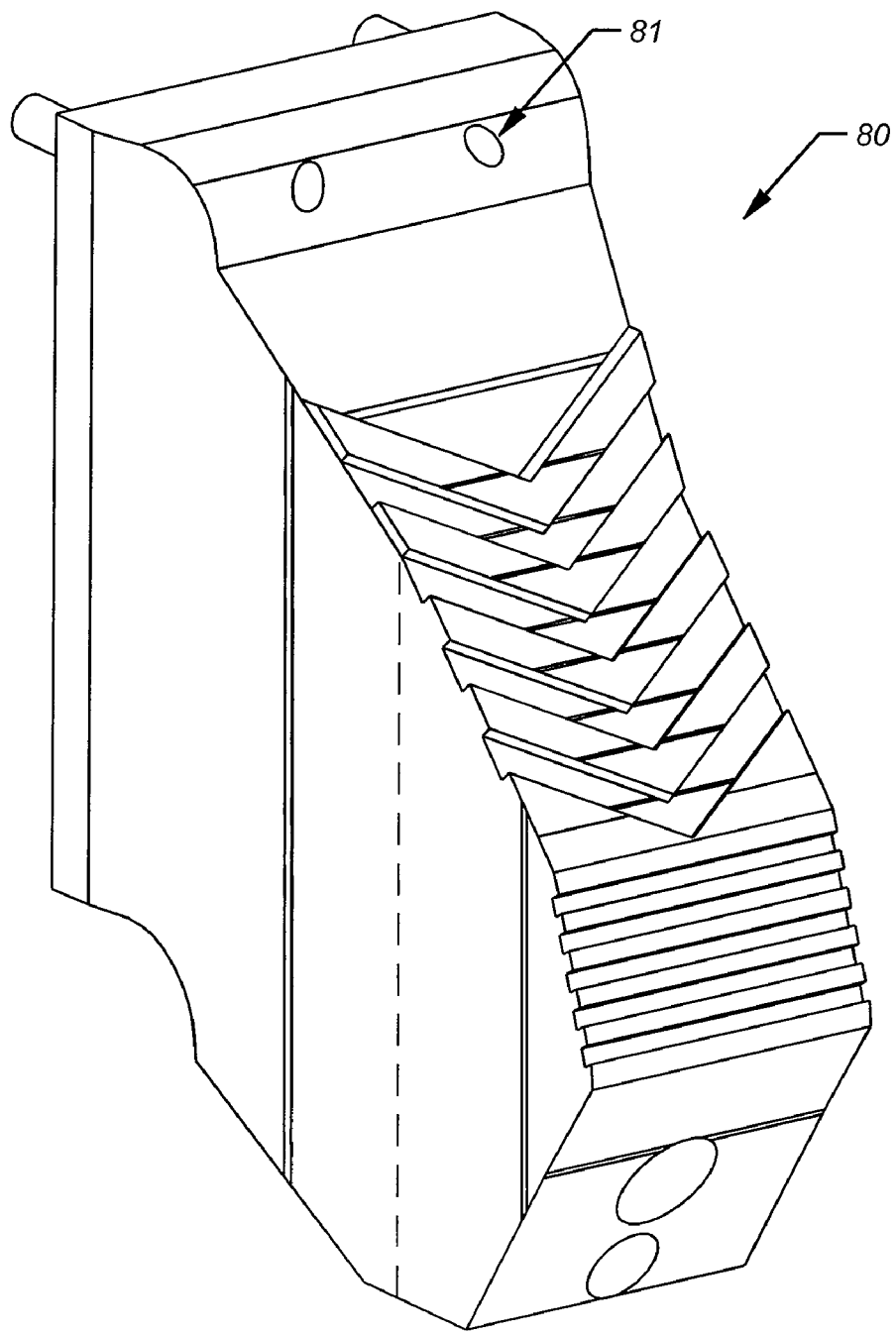
FIG. 8 is an illustration of an alternate embodiment of a burner panel of the present invention illustrating an embodiment of post combustion apertures.

Now referring to FIG. 8, a perspective view of a burner panel 80 is illustrated. Post combustion ports 81 are illustrated along an upper portion of burner panel 80.

Figure 9:
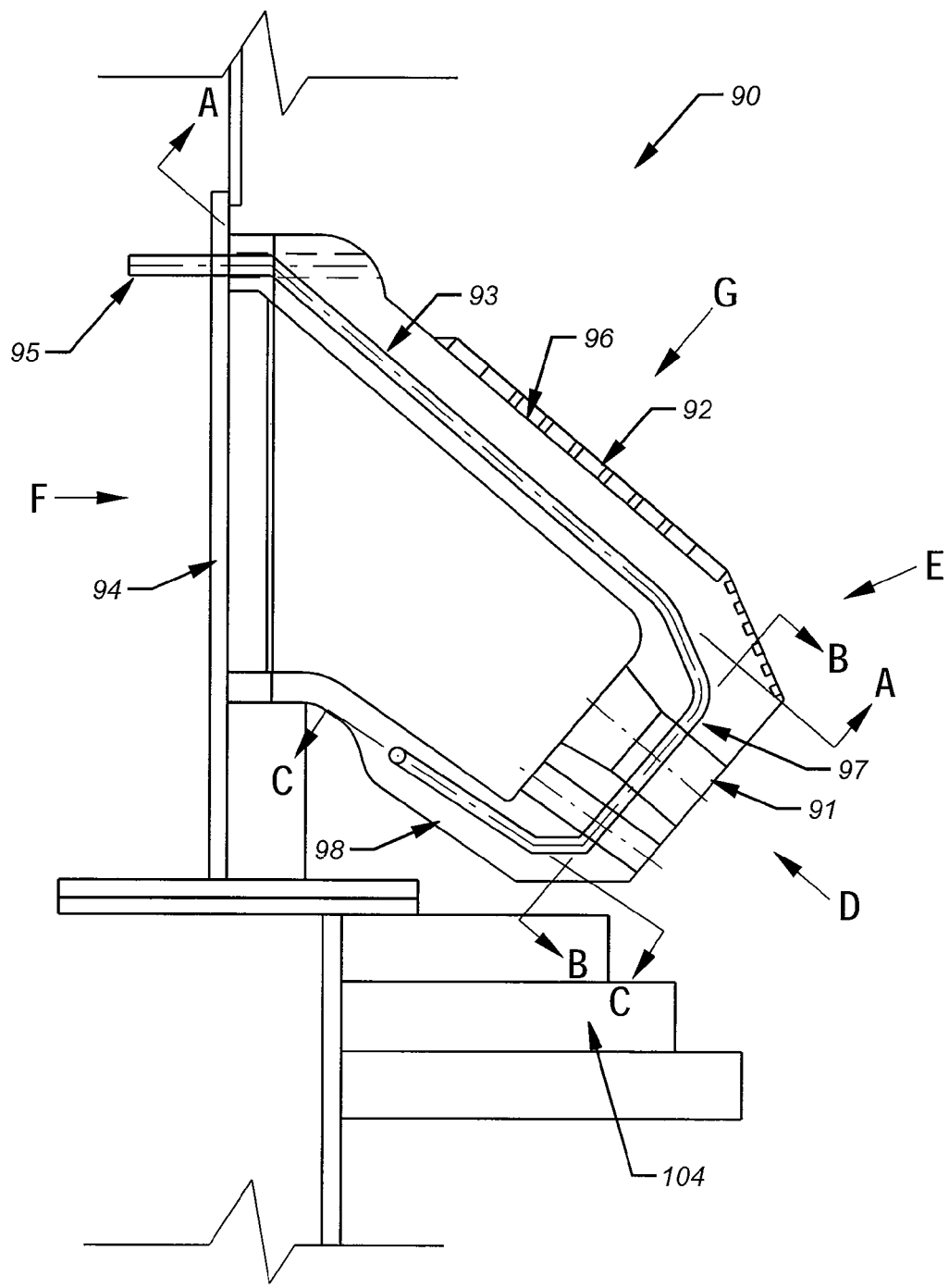
FIG. 9 is an illustration of a cross-section of an alternate embodiment of a burner panel of the present invention.

Now referring to FIG. 9, a side perspective cross section of a burner panel 90 is illustrated. Burner panel 90 generally comprises aperture 91, shaped grooves 92, conduit 93, water-cooling system connection 95, furnace wall 94, and a refractory portion 104. As is illustrated, conduit 93 generally extends about/just beneath a surface of burner panel 90. In the embodiment illustrated, water-cooling system extends beneath upper surface 96, underside surface 98, at least a portion of front side surface 97, and at least one of the side surfaces (not shown). In an embodiment, conduit 93 is connected through cooling system connection 95 and may be adapted as a plug and use system to attach directly to the cooling system within or associated with furnace wall 94. However, other embodiments are not a plug and use system. Pipes associated with conduit 93 may be constructed of any material common in the art. Typically, a highly heat conductive material is chosen. Suitable materials include, but are not limited to copper, brass, steel, iron, alloys of the same, and/or the like. Primary design considerations for an embodiment of a cooling system of the present invention comprise operating temperature, desired amount of heat to be removed from an associated burner panel, pressure of liquid within the associated pipe, flow speed of a liquid within the pipe, and/or the like. In various embodiments, generally, a water-cooling system is used along wherever the burner panel may be exposed to excessive heat. Also evident is the manner in which burner panel 90 extends over and/or beyond refractory portion 104.

Figure 10:
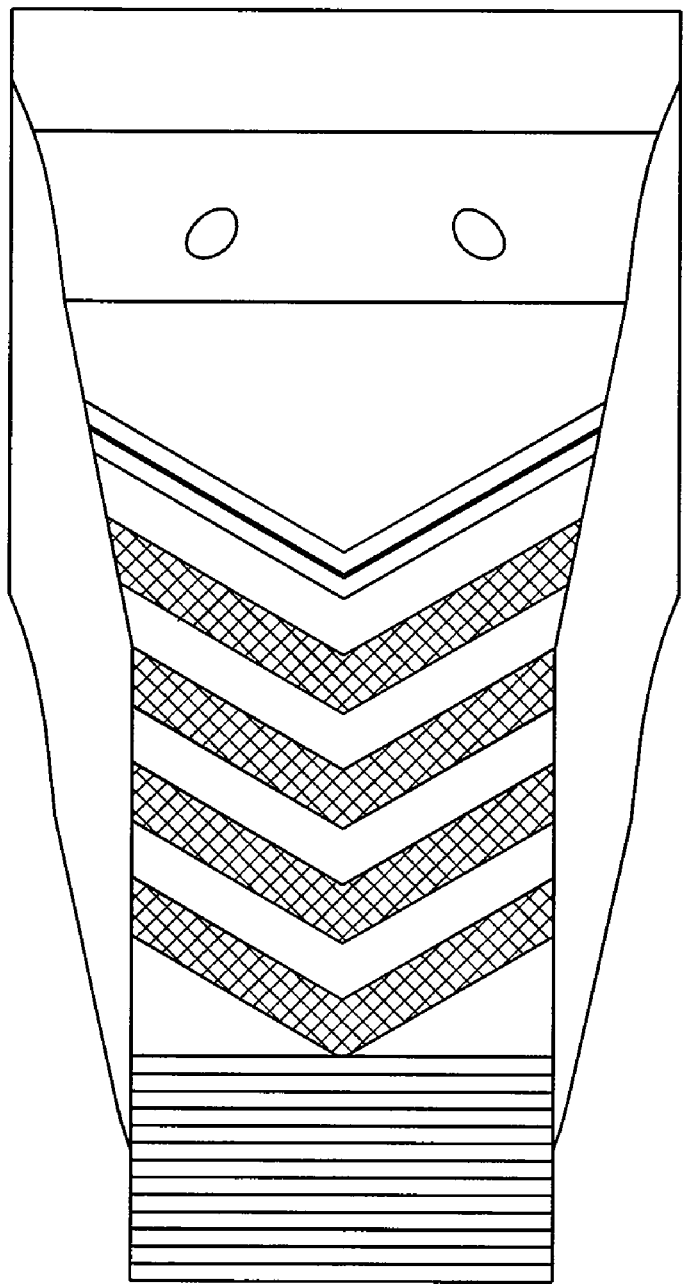
FIG. 10 is an illustration of view G illustrated on FIG. 9.

Now referring to FIG. 10, view G of burner panel 90 is illustrated from FIG. 9. The embodiment of FIG. 9 illustrates a generally roughened surface along groove(s) 96. However, in an alternate embodiment, groove(s) 96 are smooth.

Figure 11:
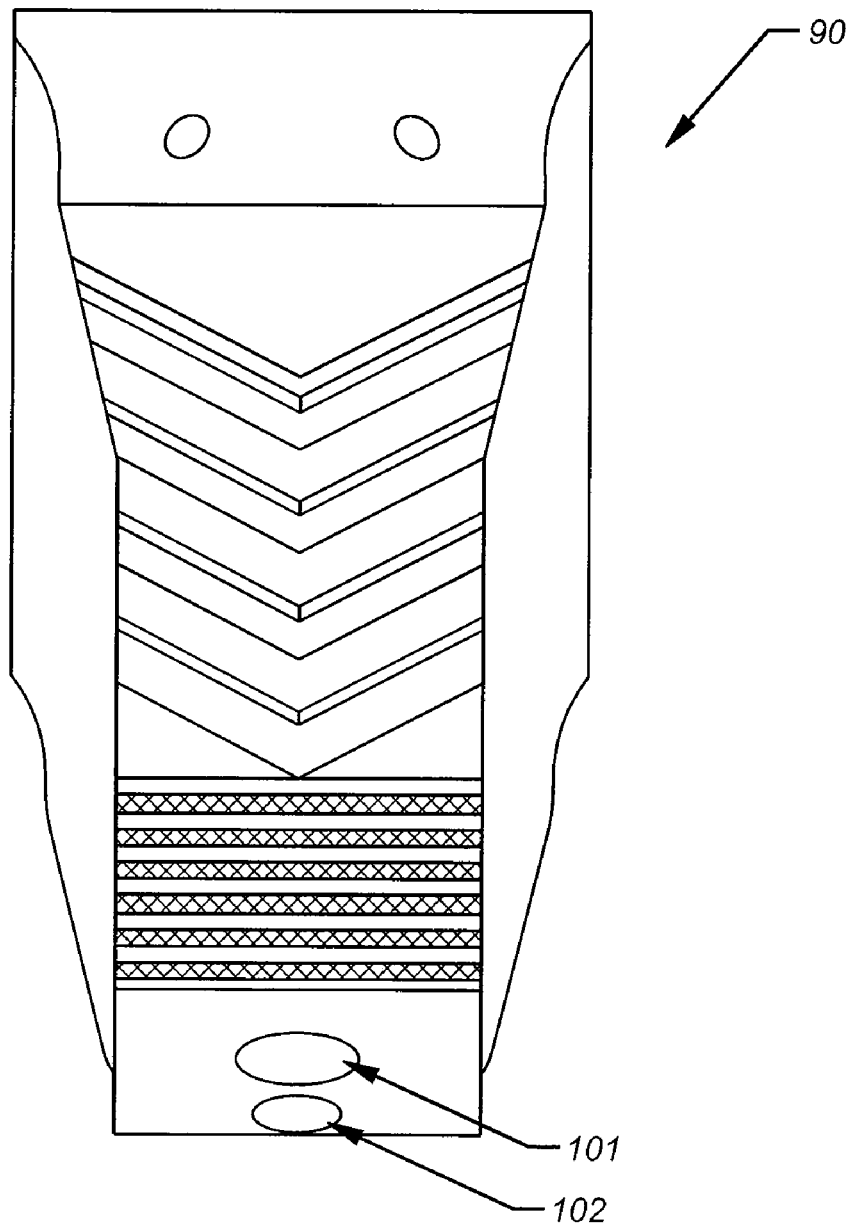
FIG. 11 is an illustration of view E on FIG. 9.

Now referring to FIG. 11, view E from FIG. 9 is illustrated. View E is illustrative of the arrangement of a carbon injector apparatus aperture 102 and an oxygen lance/burner 101 incorporated into burner panel 90.

Figure 12:
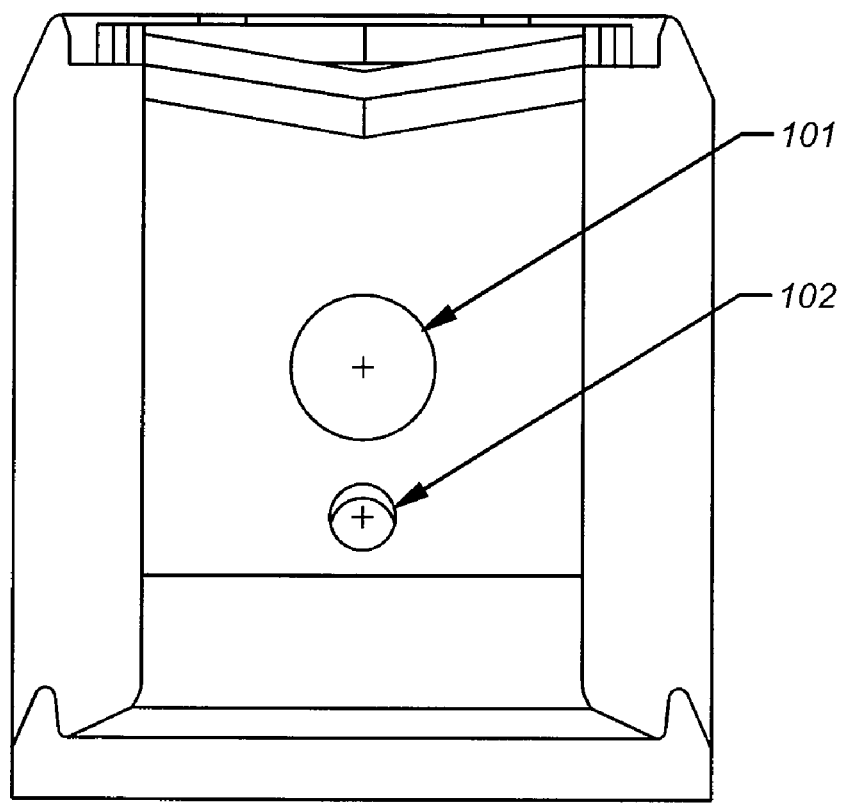
FIG. 12 is an illustration of view D on FIG. 9.

Now referring to FIG. 12, view D of FIG. 9 is illustrated. This view is illustrative of how, in various embodiments, aperture 101 and aperture 102 are at differing angles. The differing angles are commonly referred to as the angle of injection, the relative angle of injection, intersection angle, approach angle, and/or the like. The aperture angles may be varied as desired for a particular application. In typical embodiments, the aperture angles are adjusted or set such that materials and/or energy sources expelled from the apertures meet at about or just above the metal line. In alternate embodiments, the aperture angles are adjusted or set such that materials expelled from the apertures meet at about or just above the foaming slag/sill line. In an alternate embodiment, the aperture angles are adjusted or set such that materials expelled from the apertures do not meet prior to the metal line.

In an alternate embodiment, the relative angle of injection of a burner/lance relative to a carbon injection is such that a discharge from each may intersect at a distance of about 1 meter off the face of the associated burner panel.

Figure 13:
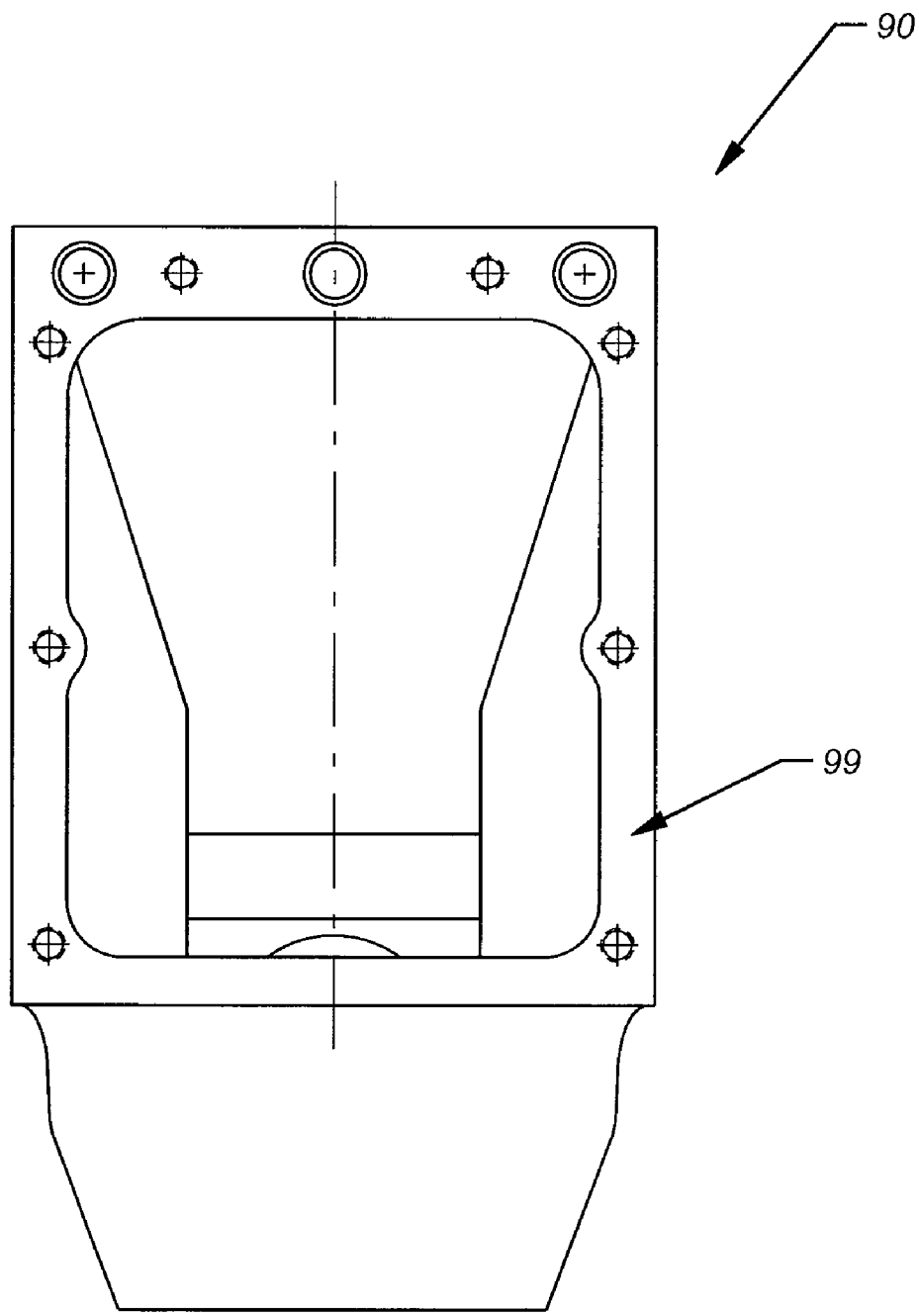
FIG. 13 is an illustration of view F on FIG. 9.

Now referring to FIG. 13, view F from FIG. 9 is illustrated. View F is generally a view from the rear of burner panel 90 illustrating mounting surface 99. In an embodiment, mounting surface 99 is designed as a plug and use system, whereby a panel or a section of the furnace may be removed and burner panel 90 directly inserted without any modifications. Further embodiments contemplate the use of a gap panel, as described herein.

Figure 14:
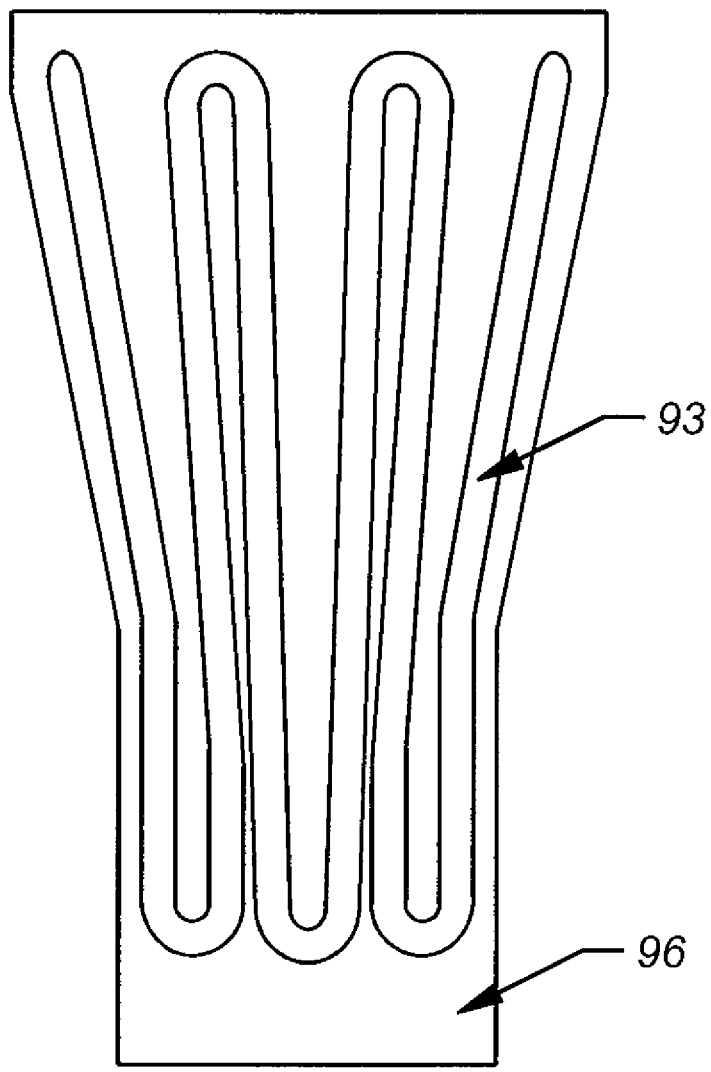
FIG. 14 is an illustration of section A-A on FIG. 9.

Now referring to FIG. 14, section A-A from FIG. 9 is illustrated. Section A-A is generally a cross-section of slice taken just below upper surface 96. The slice is taken to a depth within burner panel 90 to reveal a portion of the conduit 93 that winds around a surface of the burner panel. Conduit 93, the fluid flowing there through, and the general shape of the winding conduit 93 form a water-cooling system of the present invention.

Now referring to FIG. 15, section B-B from FIG. 9 is illustrated. Section B-B is generally a cross-section of slice taken just below front side surface 97. The slice is taken to a depth within burner panel 90 to reveal a portion of the conduit 93 that winds around a surface of the burner panel. In an embodiment, front side surface 97 may experience the greatest heat and potential for contact with splashing metal. Likewise, if aperture 101 and/or aperture 102 are used as ports for additional energy, conduits 93 may be used to maintain or remove added heat to front side surface 97.

Figure 16:
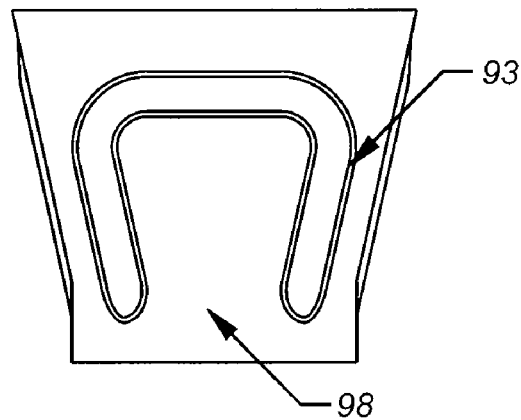
FIG. 16 is an illustration of section C-C on FIG. 9.

Now referring to FIG. 16, section C-C from FIG. 9 is illustrated. Section C-C is generally a cross-section of a slice taken just below underside surface 98. The slice is taken to a depth within burner panel 90 to reveal a portion of the conduit 93 that winds around a surface of the burner panel.

Figure 17:
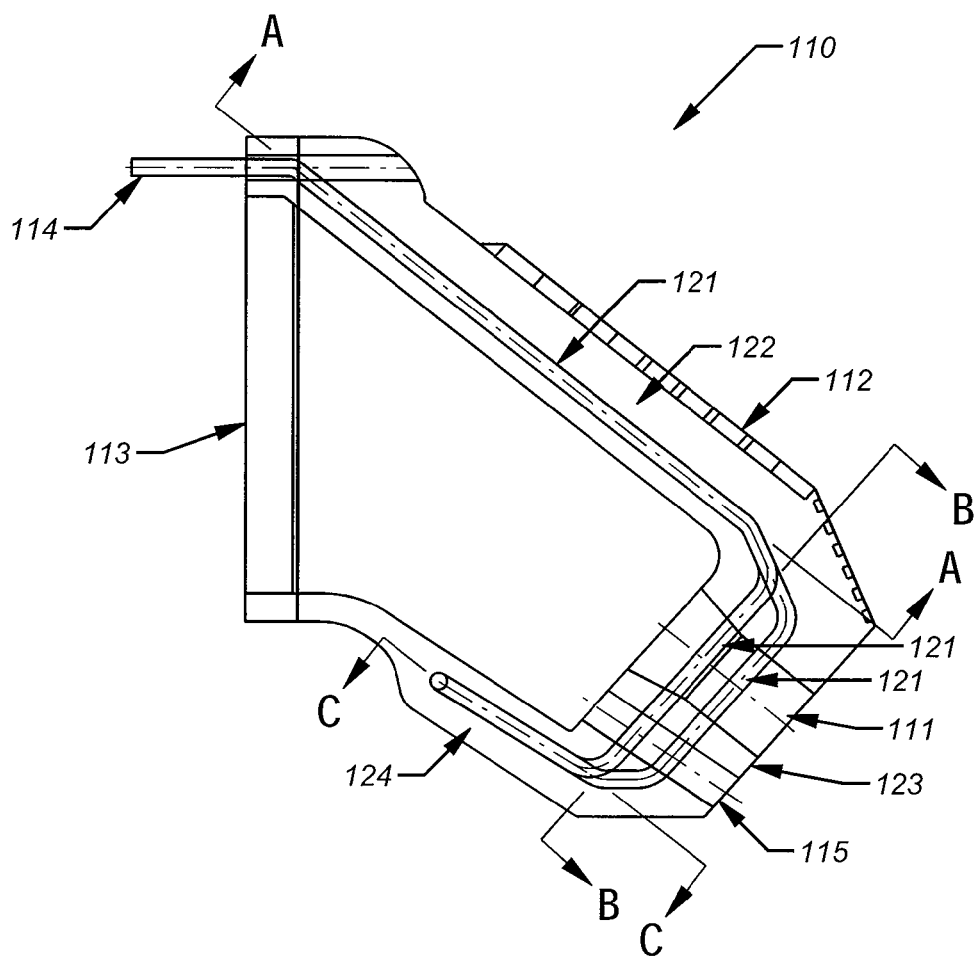
FIG. 17 is an illustration of a cross-section of an alternate embodiment of a burner panel of the present invention.

Now referring to FIG. 17, a side perspective cross section of a burner panel 110 is illustrated. Burner panel 110 generally comprises aperture 111, shaped grooves 112, conduits 121, water-cooling system connection 114 and furnace wall 113. As is illustrated, conduits 121 generally extend about/just beneath a surface of burner panel 110. In the embodiment illustrated, the water-cooling system extends beneath the upper surface 122, the underside surface 123, at least a portion of the front side surface 124, and at least one of the side surfaces (not shown). In an embodiment, conduits 121 are both connected through two cooling system connections 114 and may be adapted as a plug and use system to attach directly to the cooling system within or associated with furnace wall 113. However, other embodiments are not a plug and use system. The two conduits 121 run parallel to each other along the upper surface 122, the underside surface 123, at least a portion of the front side surface 124, and at least one of the side surfaces (not shown). Pipes associated with conduits 121 may be constructed of any material common in the art. Typically, a highly heat conductive material is chosen. Suitable materials include, but are not limited to copper, brass, steel, iron, alloys of the same, and/or the like. Primary design considerations for an embodiment of a cooling system of the present invention comprise operating temperature, desired amount of heat to be removed from an associated burner panel, pressure of liquid within the associated pipe, flow speed of a liquid within the pipe, and/or the like. In various embodiments, generally, a water-cooling system is used along wherever the burner panel may be exposed to excessive heat. Although this embodiment branches the conduit 121 into two parallel conduits 121, there may be more than two parallel conduits without departing from the scope and spirit of the present invention.

Figure 18:
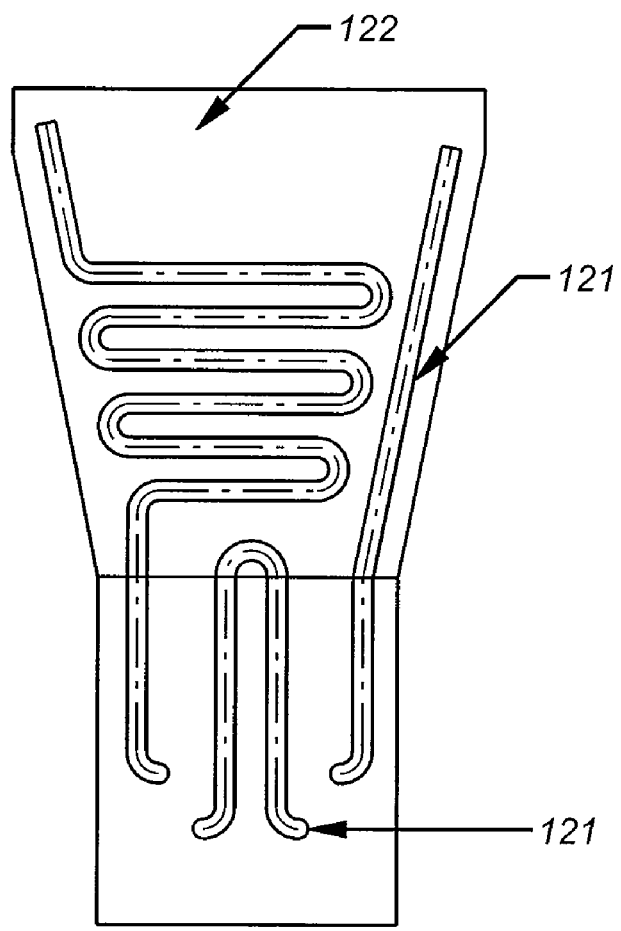
FIG. 18 is an illustration of section A-A on FIG. 17.

Now referring to FIG. 18, section A-A from FIG. 17 is illustrated. Section A-A is generally a cross-section of slice taken just below upper surface 122. The slice is taken to a depth within burner panel 110 to reveal a portion of the conduits 121 that winds around a surface of the burner panel. Conduits 121, the fluid flowing there through, and the general shape of the winding conduits 121 form a water-cooling system of the present invention.

Figure 19:
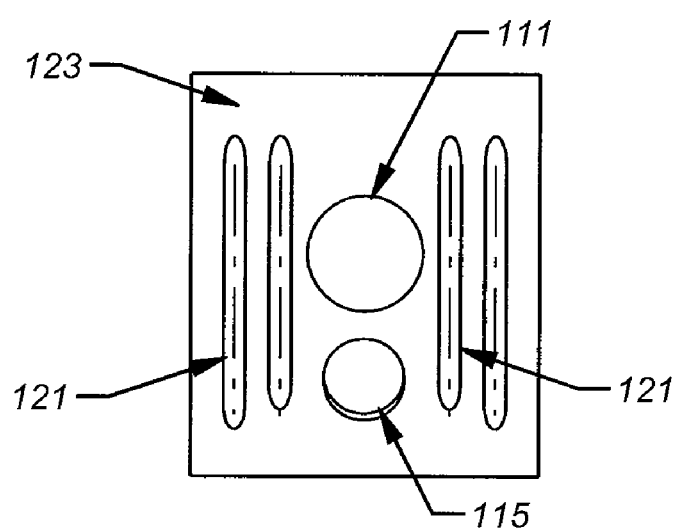
FIG. 19 is an illustration of section B-B on FIG. 17.

Now referring to FIG. 19, section B-B from FIG. 17 is illustrated. Section B-B is generally a cross-section of slice taken just below front side surface 123. The slice is taken to a depth within burner panel 110 to reveal a portion of the conduits 121 that winds around a surface of the burner panel. In an embodiment, front side surface 123 may experience the greatest heat and potential for contact with splashing metal. Likewise, if aperture 111 and/or aperture 115 are used as ports for additional energy, conduits 121 may be used to maintain or remove added heat to front side surface 123.

Figure 20:
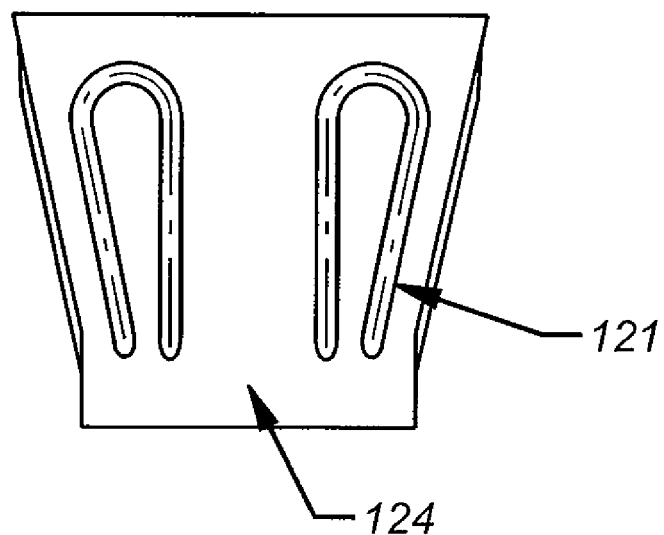
FIG. 20 is an illustration of section C-C on FIG. 17.

Now referring to FIG. 20, section C-C from FIG. 17 is illustrated. Section C-C is generally a cross-section of a slice taken just below underside surface 124. The slice is taken to a depth within burner panel 110 to reveal a portion of the conduits 121 that wind around a surface of the burner panel.

Figure 21:
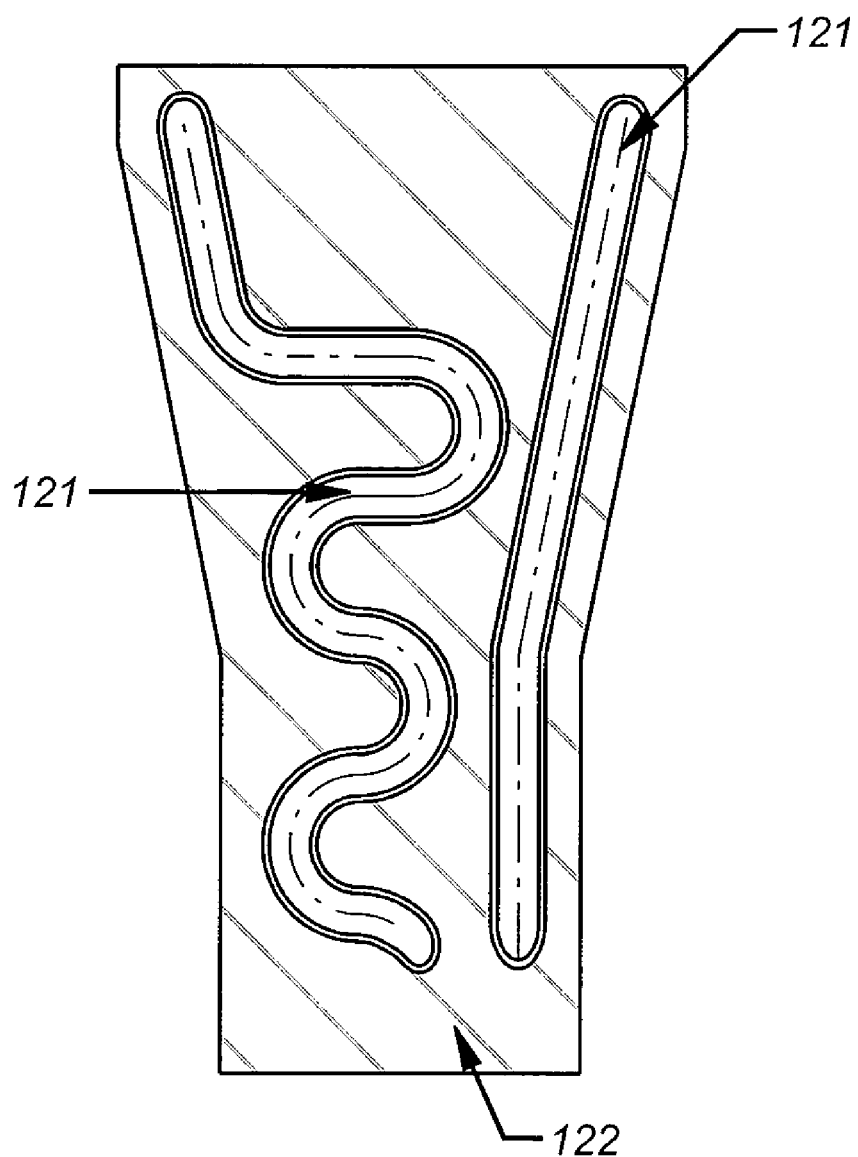
FIG. 21 is an illustration of section A-A of FIG. 17 in an alternate embodiment of the present invention.

FIG. 21 shows section A-A of FIG. 17 in an alternate embodiment of the present invention. Section A-A is generally a cross-section of slice taken just below upper surface 122. The slice is taken to a depth within burner panel 110 to reveal a portion of the conduits 121 that winds around a surface of the burner panel. Conduits 121, the fluid flowing there through, and the general shape of the winding conduits 121 form a water-cooling system of the present invention.

Figure 22:
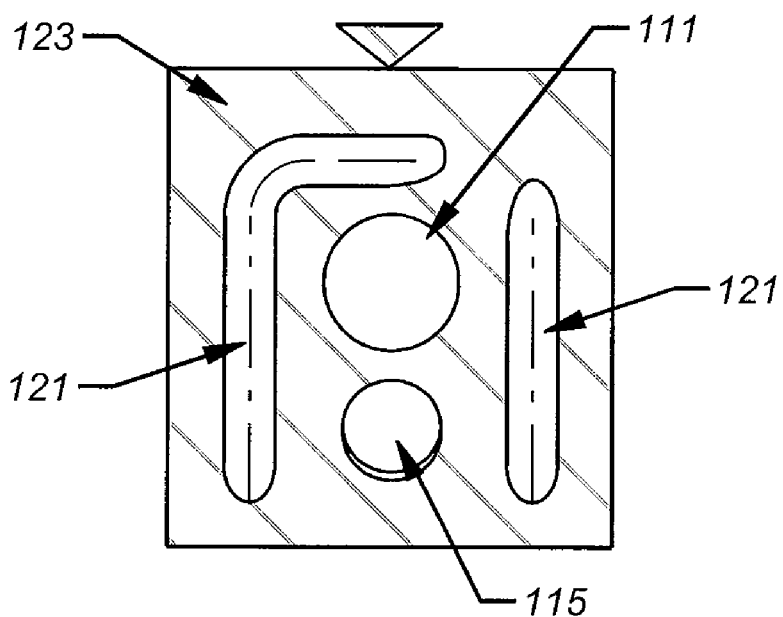
FIG. 22 is an illustration of section B-B of FIG. 17 in an alternate embodiment of the present invention.

FIG. 22 shows section B-B of FIG. 17 in an alternate embodiment of the present invention. Section B-B is generally a cross-section of slice taken just below front side surface 123. The slice is taken to a depth within burner panel 110 to reveal a portion of the conduits 121 that winds around a surface of the burner panel. In an embodiment, front side surface 123 may experience the greatest heat and potential for contact with splashing metal. Likewise, if aperture 111 and/or aperture 115 are used as ports for additional energy, conduits 121 may be used to maintain or remove added heat to front side surface 123.

Design Considerations of a Water Cooled Burner Panel

The present inventors knew from the start that the pipe may desire casting into the panel so as to avoid sand cores. The present inventors determined the tightness of various geometry pipes in making 180-degree turns, taking into account the desire to minimize the surface area exposed on the extending burner panel. Early on, after running flow calculations and determining that a 1" pipe just was not as beneficial for removing heat from the plurality of surfaces of the burner panel, a 1¼" pipe was chosen. It was desirable that the size of the extending burner panel is kept as small as possible for several reasons, including, but not limited to reducing surface area that may be struck by flashback, splashing metal, increased heat, and/or the like because the burner panel extends from the fluid cooled furnace wall towards the metal melt line or metal line.

Stage 1: Starting with Something

The present inventors started by creating a 3-dimensional space with the assistance of design software consisting of the outline of a panel and placing a large void in the interior drawing in a 3-dimensional path for water channels to cover the front hot faces. Later all of the exposed surfaces were covered with at least a portion of a cooling system.

Stage 2:

A square panel was initially constructed for extending into the furnace. However, the panel became too heavy, used too much material and was too cumbersome to adapt. Further, since more metal was used to construct the panel, a greater amount of cooling was desired to cool the metal.

Stage 3: Finding the Ideal Wedge

Figure 23:
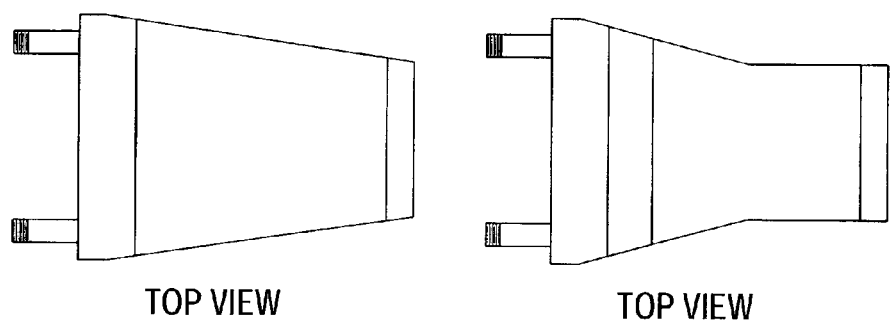
FIG. 23 is an illustration of the two designs tested in Stage 3.

It was decided to wedge the design and taper the nose away from the furnace wall. This may reduce the weight, reduce the surface area to be cooled, and/or the like, while still allowing access to the rear of the panel for inserting desired apparatuses for extending through and/or to the apertures. Two designs for the wedge as depicted in FIG. 23 were tested. Both were determined suitable.

Stage 4: Cooling System

The cooling system was designed to provide the maximum cooling effect to all surfaces of the burner panel. A single conduit was serpentine looped along the surfaces of the burner panel, taking care not to bend the pipe such that it may decrease or flatten the diameter.

As such, an embodiment of the new burner panel was initially designed. The objective of this new panel design was for this panel to incorporate a fluid-cooled system and a burner panel that extended into the furnace and closer to the metal line. This new panel has proved to exceed expectations by not only incorporating the fluid-cooled system and a burner panel that extended into the furnace and closer to the metal line, but adding additional benefits, such as improving safety (for the furnace), improving performance, and improving the longevity of this new burner panel over other products of this type in the industry.

Design Parameters

The design parameter include the desired final location of the burner and carbon pipe (for deep penetration into furnace), the desired coverage of water-cooling so as to cover hot faces and the minimum set distances of water piping (Nom ¼" schedule 80 copper pipe) to burner chamber and furnace at sides, front, top, and bottom (for furnace protection/safety), setting the copper thickness around water piping, minimizing copper usage (a natural occurrence when observing stage 3 but desired when determining overall shape; thus the wedges and tapers), minimizing the frontal exposure (a natural occurrence when observing stages 3 and 4 but desired when determining overall shape; thus the wedges and tapers) and leaving room for optional addition of post combustion oxygen ports. Also, it is desired that slag retention grooves be included.

Manufacture

The manufacturing process consists of the water piping bending, casting the panel around the pipe, and machining the final product.

Bending the Pipe

The pipe bending process consists of the following steps:

First, the pipe is cut to a desired length. Male threads are then cut at each end of the pipe (either NPT or BSPT). One end of the pipe is then capped with a threaded cap, thereby allowing the pipe to be packed with silica sand. Once the silica sand has been filled, the other end of the pipe is capped so as to confine the sand. The pipe is then bent on a jig.

When packing the pipe with sand, the pipe is hoisted vertically and the silica sand is packed in stages to ensure a consistently dense packing (dense packing helps for both avoiding flattening the pipe when it is being bent and to prevent infiltration of molten material during the casting process). The pipe is bent on a steel jig by heating the pipe with a torch and bending it around dowels that are placed in appropriate locations.

In an embodiment, sand is being used in the pipe to keep it intact during the casting process as opposed to another method such as flowing carbon dioxide, nitrogen, steam, or water through the pipe. Also, the sand used in this embodiment is silica sand. Although the preferred embodiment uses silica sand, other sands having similar conductive properties may be used without departing from the scope and spirit of the present invention. Also, through trial and error, it was determined that the tightest bend, or minimum radius, of pipe possible without flattening the pipe is an inside radius of 2¼". It is with this radius that the panel was designed.

Casting

The casting process begins by creating the molds. It is desirable that a mold be created for the outer profile, for the inner plug, and for the gap panel if used. Once the molds are created, the pipe is placed over the inner sand plug and the main mold (cope, drag, and risers) is carefully placed on top of the carefully positioned assembly. The casting should then be ready to be poured.

Machining

Once the panel has cooled it may be removed for the sand and may be ready for final preparation. The risers are cut off, such as with an abrasion saw. It is desirable that the V-shaped grooves and straight grooves be machined into the panel on a milling machine.

Results

The functionality of the water-cooling in the panel may depend at least in part on its ability to extract heat out of the panel and this may depend in large part on the amount fusion between the main body of the panel and the copper piping. The success of the casting may be observed and tested. An observation method for determining good bonding/fusion of the piping to the panel is capable of being performed with a horoscope. Examples of indications of good fusion are stratifying lines on the interior of the pipe or blisters in the pipe where it became molten all the way though to the sand. The other way to test the panel is a flow test. This is done every time as a matter of procedure at three different pressures before and after casting for documentation purposes. The before cast water flow may generally be greater than the after cast water flow. If this is the case it is generally due to the fact that deformation occurred due to the fusion/bonding of the pipe during the molding process.

Various embodiments of the present invention further comprise methods of introducing at least one energy source to a furnace through a burner panel. In an embodiment, the at least one energy source is at least one of auxiliary thermal energy to the steel making process, particulate injection for the formation of slag and foamy slag, oxygen injection for the decarburization of the melt, oxygen injection for the formation of foamy slag, or oxygen injection for post combustion burning of carbon monoxide and melting of scrap.

Further embodiments of methods of the present invention includes a method of injecting thermal energy in a furnace from a tapered burner panel apparatus, the method comprising the steps of injecting at least one energy source into a furnace from a tapered burner panel, wherein the burner panel comprises a water-cooled burner panel comprising shaped grooves; at least one apparatus aperture; and, at least one apparatus, wherein the water-cooled burner panel extends outwardly from a furnace wall at least to a split line of the furnace and wherein the energy source is at least one of an auxiliary thermal energy, at least one particulate, or oxygen. Further embodiments further comprise the step of injecting at least a second energy source of at least one of an auxiliary thermal energy, at least one particulate, or oxygen. In various embodiments the at least second energy source intersects at least the first energy source at about the metal line.

Further methods of the present invention comprise a tapered burner panel apparatus, the tapered burner panel apparatus comprising a tapered burner panel, wherein the tapered burner panel comprises a water-cooled tapered burner panel comprising shaped grooves; at least one apparatus aperture; and, at least one apparatus, wherein the water-cooled tapered burner panel extends outwardly from a furnace wall at least to a split line of the furnace, the method comprising the step of forming shaped grooves along an upper surface of the tapered burner panel whereby when liquid slag and/or foaming slag splashes on the upper surface the shaped grooves channel the slag along at least a portion of the upper surface whereby the water-cooled tapered burner panel cools the slag into an at least partially solidified slag. In various methods, the efficiency of the burner panel is increased by at least about 10%.

Further methods of the present invention comprise a method for designing or optimizing a fluid cooled system for a burner panel.

Further embodiments of the present invention comprise methods for cooling a burner panel extending away from a furnace wall and towards a metal melt line comprising extending in a serpentine manner a conduit along a majority of a plurality of surfaces of the burner panel in such a manner that the conduit is capable of removing heat from the burner panel when at least one fluid is flowing through the conduit.

Various embodiments of the present invention comprise a method for cooling a furnace burner panel housing at least one apparatus, the burner panel having a plurality of surfaces comprising an upper surface, an underside surface, a front side surface, and a plurality of side surfaces, wherein the burner panel extends away from a furnace wall to at least a split line of the furnace and is designed for injecting thermal energy into the furnace from the apparatus, the method comprising the steps of attaching a conduit, the conduit formed in a serpentine manner along a portion of at least one surface of the burner panel, wherein the conduit removes heat from the burner panel when a cooling fluid is flowing through the conduit and wherein the serpentine manner has a minimum radius; and, coupling the conduit to a cooling system connection, wherein the cooling system connection is located interior to the furnace wall.

Further embodiments comprise a method for cooling a tapered burner panel in a furnace, the burner panel having a plurality of surfaces comprising an upper surface having a plurality of shaped grooves on the upper surface's exterior side, an underside surface, a front side surface, and a plurality of side surfaces, wherein the tapered burner panel extends away from the furnace wall towards a metal melt line and is designed for injecting thermal energy into the furnace, comprising the steps of forming a conduit in a serpentine manner;

aligning the conduit along a portion of at least one surface of the burner panel, wherein the conduit removes heat from the burner panel when a cooling fluid is flowing through the conduit; and, coupling the conduit to a cooling system connection, wherein the cooling system connection is located interior to the furnace wall.

Various methods of forming at least one minimum radius bend in the conduit comprises the steps of cutting the conduit to a length; capping one end of the conduit; packing the conduit with a substance; capping the other end of the conduit; and, bending the conduit to the at least one minimum radius bend.

Further embodiments comprise a water-cooled system for use in a tapered burner panel apparatus mounted within a furnace, the burner panel extending from the furnace's wall, the water-cooled system comprising a tapered burner panel having a plurality of surfaces including an upper surface, an underside surface, a front side surface, and a plurality of side surfaces; at least one shaped groove located on an external side of the upper surface; at least one apparatus aperture located on the front side surface; and, at least one apparatus extending through the at least one aperture, wherein the tapered burner panel extends to at least a split line of the furnace and wherein the apparatus is at least one of an auxiliary thermal energy source, a particulate injector, or an oxygen injector; and, at least one conduit, wherein the at least one conduit is aligned with a portion of at least one surface of the tapered burner panel in a serpentine manner, wherein the conduit removes heat from the tapered burner panel when a cooling fluid is flowing through the conduit and wherein the serpentine manner has at least one minimum radius bend in the conduit.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes to the claims which come within the meaning and range of equivalency of the claims are to be embraced within their scope. Further, all published documents, patents, and applications mentioned herein are hereby incorporated by reference, as if presented in their entirety.

What is claimed is:

1. A method for cooling a tapered furnace burner panel housing at least one apparatus, said tapered burner panel having a plurality of surfaces comprising a mounting surface, an upper surface, an underside surface, a front side surface (smaller in surface area), and a plurality of side surfaces, wherein said upper surface of said burner panel comprises a plurality of v-shaped grooves and said burner panel extends away from a furnace wall in such a manner as to allow the front side surface of the burner panel to extend below the lower portion of the mounting surface and to extend to at least a split line of said furnace and is designed for injecting thermal energy into said furnace from said apparatus, said method comprising the steps of:
   a. positioning a conduit within the burner panel, said conduit formed in a serpentine manner just beneath and along a portion of at least one surface of said burner panel, wherein said conduit removes heat from said burner panel when a cooling fluid is flowing through said conduit and wherein said serpentine manner has a minimum radius; and
   b. coupling said conduit to a cooling system connection, wherein said cooling system connection is located interior to said furnace wall.

2. The method of claim 1, wherein said conduit is a Nom 1.25 inch, schedule 80 pipe.

3. The method of claim 1, wherein said conduit is rectangularly shaped, whereby a greater surface area of said conduit is available for removing heat from said burner panel.

4. The method of claim 1, wherein said serpentine manner has at least two 180-degree turns per at least one surface of said burner panel.

5. The method of claim 1, wherein said serpentine manner has at least two 90-degree turns per at least one surface of said burner panel.

6. The method of claim 1, wherein said serpentine manner has at least one 180-degree turn and at least one 90-degree turn per at least one surface of said burner panel.

7. The method of claim 1, wherein said conduit is integrated to at least one surface of said burner panel.

8. The method of claim 1, wherein said conduit is located interior to at least one surface of said burner panel.

9. The method of claim 1, wherein said conduit is branched at said cooling system connection, wherein at least two conduits are located interior of said burner panel.

10. The method of claim 9, wherein said at least two conduits are parallel.

11. The method of claim 1, wherein said at least one apparatus extends through at least one aperture located about said front side surface.

12. The method of claim 11, wherein said at least one aperture is three apertures and at least three apparatuses extend therefrom.

13. The method of claim 1, wherein said minimum radius is between about 0.5 inches and about 4.0 inches.

14. The method of claim 1, wherein said front side surface comprises a plurality of straight grooves.

15. A method for cooling a tapered burner panel in a furnace, said burner panel having a plurality of surfaces comprising a mounting surface, an upper surface having a plurality of v-shaped grooves on said upper surface's exterior side, an underside surface, a front side surface, and a plurality of side surfaces, wherein said tapered burner panel extends away from said furnace wall towards a metal melt line in such a manner as to allow the front side surface of the burner panel to extend below the lower portion of the mounting surface and to extend towards a metal melt line and is designed for injecting thermal energy into said furnace, comprising the steps of:
   a. forming a conduit in a serpentine manner that has at least one minimum radius bend in said conduit;
   b. aligning said conduit along a portion of at least one surface of said burner panel, said conduit being positioned just beneath the surface of said surface, wherein said conduit removes heat from said burner panel when a cooling fluid is flowing through said conduit; and
   c. coupling said conduit to a cooling system connection, wherein said cooling system connection is located interior to said furnace wall.

16. The method of claim 15, wherein said step of forming a conduit in a serpentine manner that has at least one minimum radius bend in said conduit further comprises the steps of:
   a. cutting said conduit to a length;
   b. capping one end of said conduit;
   c. packing said conduit with a substance;
   d. capping the other end of said conduit; and
   e. bending said conduit to said at least one minimum radius bend.

17. The method of claim 16, wherein said substance is a silica sand.

18. The method of claim 15, further comprising a plurality of straight grooves on said front side surface.

* * * * *